United States Patent
Holmes, IV et al.

(10) Patent No.: US 8,544,851 B2
(45) Date of Patent: Oct. 1, 2013

(54) GASKET FOR PARABOLIC RAMP SELF RESTRAINING BELL JOINT

(75) Inventors: William W. Holmes, IV, Hoover, AL (US); William H. Owen, Fultondale, AL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 13/543,763

(22) Filed: Jul. 6, 2012

(65) Prior Publication Data

US 2012/0280497 A1    Nov. 8, 2012

Related U.S. Application Data

(63) Continuation-in-part of application No. 13/216,523, filed on Aug. 24, 2011.

(60) Provisional application No. 61/376,450, filed on Aug. 24, 2010.

(51) Int. Cl.
*F16L 35/00* (2006.01)

(52) U.S. Cl.
USPC ............................ 277/602; 277/616; 285/374

(58) Field of Classification Search
USPC .................. 277/602, 607, 616, 618; 285/95, 285/110, 111, 113, 307, 338, 374, 379, 910
See application file for complete search history.

(56) References Cited

U.S. PATENT DOCUMENTS

| | | |
|---|---|---|
| 784,400 A | 3/1905 | Howe |
| 1,818,493 A | 8/1931 | McWane |
| 2,032,492 A | 3/1936 | Nathan |
| 2,201,372 A | 5/1940 | Miller |
| 2,398,399 A | 4/1946 | Alexander |
| 2,647,002 A | 7/1953 | Brummer |
| 2,953,398 A | 9/1960 | Haugen |
| 3,048,415 A | 8/1962 | Shook |
| 3,078,332 A | 2/1963 | Marx |
| 3,306,622 A | 2/1967 | Liebig |
| 3,331,611 A | 7/1967 | Liebig |
| 3,445,120 A | 5/1969 | Barr |
| 3,815,940 A | 6/1974 | Luckenbill |
| 3,857,589 A | 12/1974 | Oostenbrink |

(Continued)

FOREIGN PATENT DOCUMENTS

| | | |
|---|---|---|
| GB | 2161233 | 1/1986 |
| JP | 5311271 | 2/1978 |
| JP | 5312517 | 2/1978 |
| WO | 2011043836 | 4/2011 |

OTHER PUBLICATIONS

Holmes IV, William W., Non-Final Office Action for U.S. Appl. No. 12/711,050, filed Feb. 23, 2010; mailed Nov. 10, 2011; 24 pages.

(Continued)

*Primary Examiner* — Gilbert Lee
(74) *Attorney, Agent, or Firm* — Taylor English Duma LLP

(57) ABSTRACT

Gaskets for use with a bell and spigot coupling system are disclosed herein. The gasket comprises an elastomeric member having a front edge, a first section, and a second section. Axial forces generated by the insertion of the spigot to the first section of the elastomeric member displace the first section of the elastomeric member in an axial and radial direction.

11 Claims, 11 Drawing Sheets

(56) References Cited

U.S. PATENT DOCUMENTS

| | | | |
|---|---|---|---|
| 3,899,183 A * | 8/1975 | Wild et al. | 277/619 |
| 3,963,298 A | 6/1976 | Seiler | |
| 4,034,994 A * | 7/1977 | Ohta et al. | 277/625 |
| 4,040,651 A | 8/1977 | LaBranche | |
| 4,229,026 A | 10/1980 | Seiler | |
| 4,299,412 A | 11/1981 | Parmann | |
| 4,643,466 A | 2/1987 | Conner et al. | |
| 4,664,426 A | 5/1987 | Ueki | |
| 4,834,398 A | 5/1989 | Guzowski et al. | |
| 4,916,799 A | 4/1990 | Skinner et al. | |
| 4,991,858 A | 2/1991 | Abila et al. | |
| 5,067,751 A | 11/1991 | Walworth et al. | |
| 5,197,768 A | 3/1993 | Conner | |
| 5,269,569 A | 11/1993 | Weber et al. | |
| 5,295,697 A | 3/1994 | Weber et al. | |
| 5,297,824 A | 3/1994 | Imhof et al. | |
| 5,297,826 A | 3/1994 | Percebois et al. | |
| 5,303,935 A | 4/1994 | Saksun | |
| 5,316,352 A | 5/1994 | Smith | |
| 5,335,946 A | 8/1994 | Dent et al. | |
| 5,360,218 A | 11/1994 | Percebois et al. | |
| 5,393,107 A | 2/1995 | Vobeck | |
| 5,464,228 A | 11/1995 | Weber et al. | |
| 5,520,419 A | 5/1996 | DeBoalt et al. | |
| 5,580,068 A | 12/1996 | Gundy | |
| 5,779,285 A | 7/1998 | Robison | |
| 5,853,655 A | 12/1998 | Baker | |
| 5,988,695 A | 11/1999 | Corbett | |
| 6,062,611 A | 5/2000 | Percebois et al. | |
| 6,142,484 A | 11/2000 | Valls | |
| 6,152,494 A | 11/2000 | Corbett et al. | |
| 6,220,635 B1 | 4/2001 | Vitel et al. | |
| 6,299,176 B1 | 10/2001 | Guzowski et al. | |
| 6,457,718 B1 | 10/2002 | Quesada | |
| 6,488,319 B2 | 12/2002 | Jones | |
| 6,488,583 B1 | 12/2002 | Jones et al. | |
| 6,499,744 B1 | 12/2002 | Quesada | |
| 6,502,867 B2 | 1/2003 | Holmes et al. | |
| 6,550,500 B2 | 4/2003 | Jarvenkyla et al. | |
| 6,688,652 B2 | 2/2004 | Holmes et al. | |
| 6,945,570 B2 | 9/2005 | Jones | |
| 6,947,443 B1 | 9/2005 | Corbett | |
| 6,974,160 B2 | 12/2005 | Jones | |
| D514,671 S | 2/2006 | Jones | |
| 7,093,863 B2 | 8/2006 | Holmes | |
| 7,104,573 B2 | 9/2006 | Copeland | |
| 7,108,289 B1 | 9/2006 | Holmes | |
| 7,125,054 B2 | 10/2006 | Jones | |
| 7,134,204 B2 | 11/2006 | Corbett et al. | |
| 7,137,653 B2 | 11/2006 | Copeland | |
| 7,140,618 B2 | 11/2006 | Valls | |
| 7,207,606 B2 | 4/2007 | Owen et al. | |
| D553,716 S | 10/2007 | Lockard | |
| 7,284,310 B2 | 10/2007 | Jones et al. | |
| D556,866 S | 12/2007 | Darce | |
| D556,867 S | 12/2007 | Darce | |
| D557,386 S | 12/2007 | Darce | |
| D557,387 S | 12/2007 | Darce | |
| D557,771 S | 12/2007 | Darce | |
| D558,310 S | 12/2007 | Quesada | |
| 7,310,867 B2 | 12/2007 | Corbett | |
| D559,363 S | 1/2008 | Darce | |
| 7,328,493 B2 | 2/2008 | Jones et al. | |
| 7,354,073 B2 | 4/2008 | Sakamoto | |
| 7,392,989 B2 | 7/2008 | Corbett | |
| 7,401,819 B2 | 7/2008 | Gibb et al. | |
| 7,404,872 B2 | 7/2008 | Fisher | |
| D574,934 S | 8/2008 | Darce et al. | |
| 7,410,174 B2 | 8/2008 | Jones et al. | |
| 7,441,319 B2 | 10/2008 | Corbett et al. | |
| 7,509,724 B2 | 3/2009 | Corbett et al. | |
| 7,513,536 B2 | 4/2009 | Corbett et al. | |
| 7,537,248 B2 | 5/2009 | Jones et al. | |
| 7,618,071 B2 | 11/2009 | Jones et al. | |
| 7,789,431 B2 | 9/2010 | Freudendahl | |
| 8,096,585 B2 | 1/2012 | Vitel et al. | |
| 2002/0017789 A1 | 2/2002 | Holmes | |
| 2004/0130103 A1 | 7/2004 | Corbett | |
| 2004/0140625 A1 | 7/2004 | Valls, Jr. | |
| 2004/0150170 A1 | 8/2004 | Shaffer et al. | |
| 2004/0232627 A1 | 11/2004 | Corbett | |
| 2004/0234776 A1 | 11/2004 | Corbett | |
| 2005/0046189 A1 | 3/2005 | Corbett et al. | |
| 2006/0071431 A1 | 4/2006 | Corbett, Jr. | |
| 2006/0125193 A1 | 6/2006 | Corbett, Jr. et al. | |
| 2006/0181031 A1 | 8/2006 | Corbett, Jr. et al. | |
| 2007/0063516 A1 | 3/2007 | Jones et al. | |
| 2007/0200005 A1 | 8/2007 | Corbett et al. | |
| 2007/0210528 A1 | 9/2007 | Baber | |
| 2008/0001401 A1 | 1/2008 | Quesada et al. | |
| 2008/0007057 A1 | 1/2008 | Schmuck et al. | |
| 2008/0007062 A1 | 1/2008 | Jones et al. | |
| 2008/0012239 A1 | 1/2008 | Corbett et al. | |
| 2008/0018017 A1 | 1/2008 | Quesada et al. | |
| 2008/0018057 A1 | 1/2008 | Gibb et al. | |
| 2008/0111319 A1 | 5/2008 | Nowack et al. | |
| 2008/0157524 A1 | 7/2008 | Jones et al. | |
| 2008/0272595 A1 | 11/2008 | Gibb et al. | |
| 2008/0277884 A1 | 11/2008 | Corbett et al. | |
| 2008/0284166 A1 | 11/2008 | Darce et al. | |
| 2008/0290652 A1 | 11/2008 | Gibb et al. | |
| 2008/0303220 A1 | 12/2008 | Darce et al. | |
| 2009/0060635 A1 | 3/2009 | Jones et al. | |
| 2009/0152863 A1 | 6/2009 | Steinbruck | |
| 2009/0200705 A1 | 8/2009 | Mora | |
| 2009/0273184 A1 | 11/2009 | Wright et al. | |
| 2010/0045029 A1 | 2/2010 | Youssef et al. | |
| 2010/0078937 A1 | 4/2010 | Jones et al. | |
| 2010/0090460 A1 | 4/2010 | Vitel et al. | |
| 2010/0225111 A1 | 9/2010 | Owen | |
| 2011/0024995 A1 | 2/2011 | Schaefer et al. | |
| 2011/0266752 A1 | 11/2011 | Kocurek et al. | |

OTHER PUBLICATIONS

Holmes IV, William W., Restriction Requirement for U.S. Appl. No. 12/711,050, filed Feb. 23, 2010; mailed Sep. 15, 2011; 7 pages.
Holmes IV, William W., Restriction Requirement for U.S. Appl. No. 12/711,050, filed Feb. 23, 2010; mailed Mar. 17, 2011; 6 pages.
Holmes IV, William W., Patent Application Entitled: Simplified Low Insertion Force Sealing Device Capable of Self Restraint and Joint Deflection; U.S. Appl. No. 12/711,050, filed Feb. 23, 2010; 31 pgs.
Holmes IV, William W., Patent Application Entitled: Simplified Low Insertion Force Sealing Device Capable of Self Restraint and Joint Deflection; U.S. Appl. No. 13/103,126, filed May 9, 2011; 28 pgs.
Holmes IV, William W., Patent Application Entitled: Simplified Low Insertion Force Sealing Device Capable of Self Restraint and Joint Deflection; U.S. Appl. No. 13/284,915, filed Oct. 30, 2011; 27 pgs.
Holmes; Non-Final Office Action for U.S. Appl. No. 13/284,915, filed Oct. 30, 2011; mailed Dec. 7, 2011, 9 pages.
Holmes IV, William W.; Final Office Action for U.S. Appl. No. 12/711,050, filed Feb. 23, 2010, mailed Feb. 16, 2012; 22 pgs.
Holmes, IV, William W.; U.S. Patent Application Entitled: Gasket for Parabolic Ramp Self Restraining Bell Joint under U.S. Appl. No. 13/216,523, filed Aug. 24, 2011, 34 pgs.
Holmes, IV, William W.; Non Final Office Action for U.S. Appl. No. 13/216,523, filed Aug. 24, 2011, mailed Feb. 15, 2012, 9 pgs.
Holmes, IV, William W.; PCT Patent Application Entitled: Gasket for Parabolic Ramp Self Restraining Bell Joint under application No. PCT/US11/48953, filed Aug. 24, 2011, 48 pgs.
Holmes, IV, William W.; U.S. Provisional Patent Application Entitled: Gasket for Parabolic Ramp Self Restraining Bell Joint under U.S. Appl. No. 61/376,450, filed Aug. 24, 2010, 45 pgs.
Holmes IV, William W.; Restriction Requirement for U.S. Appl. No. 13/113,684, filed May 23, 2011, mailed Mar. 5, 2012, 6 pgs.
Holmes, IV William W.; PCT Application Entitled: Simplified Low Insertion Force Sealing Device Capable of Self Restraint and Joint Deflection under application No. PCT/US11/37565, filed May 23, 2011; 29 pgs.
Holmes, IV William W.; International Search Report and Written Opinion for application No. PCT/US11/37565; filed May 23, 2011; mailed Sep. 8, 2011; 9 pages.

Holmes, IV, William W., Applicant-Initiated Interview Summary for U.S. Appl. No. 13/284,915, filed Oct. 30, 2011, mailed Mar. 16, 2012, 3 pgs.

Holmes IV, William W.; U.S. Patent Application Entitled: Simplified Low Insertion Force Sealing Device Capable of Self Restraining and Joint Deflection under U.S. Appl. No. 13/113,684, filed May 23, 2011, 29 pgs.

Holmes; Applicant-Initiated Interview Summary for U.S. Appl. No. 12/711,050, filed Feb. 23, 2010, mailed Mar. 27, 2012; 3 pgs.

Holmes; Final Office Action for U.S. Appl. No. 13/284,915, filed Oct. 30, 2011, mailed Apr. 10, 2012; 29 pgs.

Holmes IV, William W., Non-Final Office Action for U.S. Appl. No. 13/113,684, filed May 23, 2011, mailed Apr. 12, 2012; 9 pgs.

Holmes, IV, William W.; Non-Final Office Action for U.S. Appl. No. 12/711,050, filed Feb. 23, 2010, mailed May 9, 2012; 20 pgs.

Holmes, William W.; U.S. Patent Application Entitled: Simplified Low Insertion Force Sealing Device Capable of Self Restraint and Joint Deflection, U.S. Appl. No. 13/475,335, filed May 18, 2012, 28 pgs.

Holmes, William W.; U.S. Patent Application Entitled: Simplified Low Insertion Force Sealing Device Capable of Self Restraint and Joint Deflection, U.S. Appl. No. 13/475,353, filed May 18, 2012, 28 pgs.

Bridges, J.S. "The Evolution of Piping", Handbook of Cast Iron Pipe for Water, Gas, Steam, Air, Chemicals and Abrasives, May 1927, 3 pgs.

Article entitled, "Rubber-Gasket Joints for Ductile-Iron Pressure Pipe and Fittings", American Water Works Association, Mar. 1, 2007, 3 pgs.

Fisher, Virginia E. "The History of United States Pipe and Foundry Company: A Centennial Celebration", Mar. 1999, 4 pgs.

Article entitled, "Integrated Operation of United States Pipe and Foundry Company", United States Pipe and Foundry Company, 1956, 3 pgs.

Article entitled, "Joint Restraint", located at www.uspipe.com/main/Default.asp?CategoryID=4&SubCategoryID=5 accessed on Jul. 12, 2012; 2 pgs.

Holmes, William W. IV; International Search Report and Written Opinion for serial No. PCT/US2011/048953, filed Aug. 24, 2011, mailed Apr. 3, 2012; 10 pgs.

Holmes; PCT Application entitled: Simplified Low Insertion Force Sealing Device Capable of Self Restraint and Joint Deflection having serial No. PCT/US10/25074, filed Feb. 23, 2010, 31 pgs.

Holmes; International Search Report and Written Opinion for serial No. PCT/US10/025074, filed Feb. 23, 2010, mailed Apr. 21, 2010, 2 pgs.

German, Mikhail; Non Final Office Action for U.S. Appl. No. 12/902,888, filed Oct. 12, 2010, mailed Jul. 23, 2012; 12 pgs.

German, Mikhail; U.S. Patent Application entitled: Self-Restrained Pipe Joint System and Method of Assembly, having U.S. Appl. No. 12/902,888, filed Oct. 12, 2010; 24 pgs.

Holmes, William; Final Office Action for U.S. Appl. No. 13/113,684, filed May 23, 2011, mailed Jul. 20, 2012, 9 pgs.

Holmes IV, William W.; Final Office Action for U.S. Appl. No. 12/711,050, filed Feb. 23, 2010, mailed Aug. 29, 2012; 26 pgs.

Holmes; U.S. Provisional Patent Application entitled: Parabolic Ramp Self-Restraining Bell Joint having U.S. Appl. No. 61/250,160, filed Oct. 9, 2009, 19 pgs.

Holmes; U.S. Provisional Patent Application entitled: Simplified Low Insertion Force Sealing Device Capable of Self Restraint and Deflection having U.S. Appl. No. 61/301,462, filed Feb. 4, 2010, 29 pgs.

Holmes; U.S. Provisional Patent Application entitled: Simplified Low Insertion Force Sealing Device Capable of Self Restraint and Joint Deflection having U.S. Appl. No. 61/347,612, filed May 24, 2010, 32 pgs.

Holmes; U.S. Provisional Patent Application entitled: Self-Restrained Pipe Joint System and Method of Assembly having U.S. Appl. No. 61/250,740, filed Oct. 12, 2009, 19 pgs.

Holmes, IV, William W.; Applicant-Initiated Interview Summary for U.S. Appl. No. 12/711,050, filed Feb. 23, 2010, mailed Oct. 17, 2012; 5 pgs.

Article entitled, "Ductile Iron Pipe", located at www.uspipe.com/Main/Default.asp?CategoryID=4&SubCategoryID = 1 accessed on Jul. 12, 2012; 1 pg.

Holmes, IV, William W.; Non-Final Office Action for U.S. Appl. No. 13/475,353, filed May 18, 2012, mailed Oct. 16, 2012; 20 pgs.

Holmes, IV, William W.; Applicant-Initiated Interview Summary for U.S. Appl. No. 12/711,050, filed Feb. 23, 2010, mailed Aug. 29, 2012; 3 pgs.

German, Mikhail; Restriction Requirement for U.S. Appl. No. 12/902,888, filed Oct. 12, 2010; mailed May 29, 2012; 7 pages.

German, Mikhail; Applicant-Initiated Interview Summary for U.S. Appl. No. 12/902,888, filed Oct. 12, 2010, mailed Oct. 31, 2012, 3 pgs.

International Preliminary Report on Patentability for serial No. PCT/US2011/037565, filed May 23, 2011, mailed Sep. 8, 2011, 7 pgs.

Holmes IV, William W.; Non-Final Office Action for U.S. Appl. No. 13/113,684, filed May 23, 2011, mailed Nov. 9, 2012; 25 Pgs.

Holmes, William W. IV; Non-Final Office Action for U.S. Appl. No. 12/711,050, filed Feb. 23, 2010, mailed Dec. 20, 2012, 23 pgs.

Holmes IV, William W.; Final Office Action for U.S. Appl. No. 12/711,050, filed Feb. 23, 2010, mailed Apr. 11, 2013; 30 pgs.

German, Mikhail; Applicant-Initiated Interview Summary for U.S. Appl. No. 12/902,888, filed Oct. 12, 2010, mailed Apr. 16, 2013, 3 pgs.

Holmes IV, William W.; Applicant Initiated Interview Summary for U.S. Appl. No. 13/475,353, filed May 18, 2012, mailed Apr. 12, 2013, 3 pgs.

German, Mikhail; Final Office Action for U.S. Appl. No. 12/902,888, filed Oct. 12, 2010, mailed Jan. 28, 2013; 30 pgs.

Holmes IV, William W.; Final Office Action for U.S. Appl. No. 13/475,353, filed May 18, 2012, mailed Jan. 25, 2013; 15 pgs.

Holmes, William W. IV; International Preliminary Report on Patentability for serial No. PCT/US2011/048953, filed Aug. 24, 2011, mailed Feb. 26, 2013; 6 pgs.

Holmes IV, William W.; Final Office Action for U.S. Appl. No. 13/113,684, filed May 23, 2011, mailed Mar. 4, 2013; 22 pgs.

Holmes IV, William W.; Non-Final Office Action for U.S. Appl. No. 13/103,126, filed May 9, 2011, mailed Apr. 2, 2013, 27 pgs.

German, Mikhail; Applicant-Initiated Interview Summary for U.S. Appl. No. 12/902,888, filed Oct. 12, 2010, mailed Apr. 4, 2013, 3 pgs.

Holmes, IV, William W.; Non-Final Office Action for U.S. Appl. No. 13/475,335, filed May 18, 2012, mailed Apr. 3, 2013, 28 pgs.

Holmes IV, William W.; Notice of Allowance for U.S. Appl. No. 13/475,353, filed May 18, 2012, mailed May 17, 2013, 16 pgs.

Holmes IV, William W.; Notice of Allowance for U.S. Appl. No. 13/113,684, filed May 23, 2011, mailed Jun. 28, 2013; 16 pgs.

Holmes IV, William W.; Notice of Allowance for U.S. Appl. No. 13/103,126, filed May 9, 2011, mailed Jul. 11, 2013, 14 pgs.

Holmes IV, William W.; Notice of Allowance for U.S. Appl. No. 13/475,335, filed May 18, 2012, mailed Jul. 11, 2013, 12 pgs.

Holmes IV, William W.; Non-Final Office Action for U.S. Appl. No. 12/711,050, filed Feb. 23, 2010, mailed Jul. 22, 2013, 33 pgs.

* cited by examiner

GASKET FOR PARABOLIC RAMP SELF RESTRAINING BELL JOINT

CROSS-REFERENCE TO RELATED APPLICATION

This application is a continuation-in-part of U.S. patent application Ser. No. 13/216,523, filed on Aug. 24, 2011, which claims the benefit of U.S. Provisional Application 61/376,450, filed on Aug. 24, 2010, both of which are hereby incorporated by reference herein in their entirety.

BACKGROUND

1. Field

The disclosure is directed to couplings and methods of coup g, particularly to bell and spigot couplings and methods.

2. Description of Related Art

Members of the flow control industry, such as producers of pipeline components for the transmission of water, gas, oil, or other fluids have focused substantial attention on the problem of creating and maintaining connections between adjacent lengths of pipe, or pipes and fittings, or pipes and valves. In applications where the fluid, such as water for fire mains or water distribution in municipalities, is under high pressure, various means are used to prevent separation of the joints between piping components. Piping components are joined to prevent separation caused by thrust forces, earth movement, and external mechanical forces exerted on piping components. These components include, for example, pipes, couplings, fittings, valves, and fire hydrants. The majority of the solutions can be categorized into either "push-on joints," "mechanical joints," or "flanged joints."

Iron pipe has traditionally been used to withstand the large pressures that are necessary for municipal water systems and other systems. Those pressures are needed to carry fluids over long distances, to carry large amounts of fluids, and to prevent contamination of the systems in the event of a hole or other breach of the system. There are two related problems in the history of using pipes of any sort, including iron pipe: (1) creating a secure seal to join the pipes and to withstand large pressures, and (2) bending or deflecting the joints of the pipes to meet the intended use of the pipes.

The first substantial use of cast iron pipe was in Europe in the 17th century. The piping systems of the 17th and 18th centuries primarily had flanged ends that bolted together with lead or rawhide gaskets for sealing. Flanged joints continue to be used for some applications today, but with rubber gaskets. Flanged joint systems are costly to install and require considerable maintenance.

The first bell and spigot joint was developed by Thomas Simpson of the Chelsea Water Company in England in 1785. The joint was caulked with jute rope impregnated with pine resin or tallow and sealed in place with molten lead. The bell and spigot joint remained the predominant pipe joint until the advent of the push-on joint, for example the TYTON® Joint, in 1956.

There are numerous methods of securing piping components in series to make up a pipeline, roughly divisible into three main categories: (1) rigid, as with bolted flange connections; (2) flexible, as with numerous designs such as TYTON® push-on joints and gaskets, or TYTON® combined with self-restraining gaskets bearing toothed inserts, such as FIELD LOK 350® Gaskets providing both sealing and autonomous restraint; and (3) others with a limited amount of incidental flexibility, such as PVC Pipe with Richer Gaskets where minor flexibility is possible due to the plasticity of the gasket and pipe materials and to joint tolerancing.

Push-on solutions are exemplified by U.S. Pat. No. 2,953,398, and account for the majority of straight-run pipe connections. In a typical configuration, a spigot of a pipe slides into a bell of another pipe past a tightly-fitted gasket. A variation of the push-on joint is evidenced by U.S. Pat. No. 2,201,372, which employs a compression snap-ring fitted within a special lip of the bell, in order to exert pressure onto locking segments and thus drive them into the spigot, restraining the joint against thrust forces. U.S. Pat. No. 3,445,120, likewise employs a gasket with toothed, locking segments encased therein that are generally disposed such that they and the gasket may roll between a locked and a free position. As the gasket rolls under extraction forces, it is intended eventually to encounter a position in which the segments must compress the gasket to allow further rotation of the segment and engagement of the teeth with the mating pipe spigot, thereby terminating the rotation and compression of the gasket and restraining the joint.

Other examples of restrained push-on joints include those disclosed in U.S. Pat. Nos. 5,295,697, 5,464,228, and 5,067,751. In those references, the connection is effected by either locking segments or wedges within the gasket that engage the spigot. The locking segments possess a groove that mates with an annular rib on the bell, such that the rib acts as a rocker, or cam, or, alternatively, as a wedge. During insertion of the spigot into the bell, the segments rotate on the rib, but are prevented from appreciable axial movement by the mating of the rib and groove. Upon experiencing counter-forces tending to effect removal of the spigot, the rib acts as a cam, both causing the segments to pivot on the rib as an axis, and exerting a radially inward pressure as the segment attempts to slide past the rib. These types of joints depend on compressive force on the rubber gasket to maintain the connection of the pipes.

While the push-on type joint has obtained wide acceptance for pipe joints, acceptance for fittings, valves, and hydrants is much lower. The contours of bell sockets of the push-on joint require a high degree of precision for a cast surface. In restrained joints, an additional locking joint is necessary, which also requires a high degree of precision to manufacture. It often takes a high degree of skill and alignment precision, as well as substantial force (i.e. in the range of 600 to 800 pounds of force for an eight inch size pipe), to assemble joints using the above described push-on type joints. The insertion force with present push-on designs increases proportionally with conduit diameter. Moreover, insertion forces increase substantially in low-temperature conditions.

A current trend in the industry is to manufacture pipe with walls much thinner than the current designs. Whether the pipe end is produced in a manufacturing plant or is the result of field cuts required to adjust the length of the pipe, it is not practical to have beveled or rounded ends in such pipes. Damage to the gaskets or displacement of the gaskets is a likely outcome when inserting a spigot end of a pipe not properly aligned or without a beveled or rounded end into the bell of another push-on joint pipeline component. A further consequence of the high assembly forces required is that installers favor mechanical joint connections for fittings, valves, and hydrant shoes because they require lower assembly forces.

Attempts to design low insertion-resistance joints have been made in the past using normal straight-sided conical bell sockets and straight-sided conical gaskets, but these designs were not completely satisfactory because normal conical inner surfaces do not allow for sufficient deflection of the bell and socket joint. During off axis rotation, at least some of the locking segments of the gasket will be unable to engage the spigot due to misalignment in interface between the outer surface of the gasket and the inner surface of the bell socket. This misalignment can cause irregular engagement of the spigot, inconsistent loading of the gasket, point loads in the bell socket, unlocking of locking segments, and/or broken teeth of the locking segments. For example, U.S. Pat. No. 3,815,940 and U.S. Patent Application Publication No. 2009/0060635 both show bells with conical inner surfaces. Thus there is a need for a connection that is less sensitive to misalignment and temperature extremes and has little to minimal frictional resistance to the insertion of the spigot until the desired connection is achieved and the coupling is maintained, yet maintains a seal under high pressures, even when the joint is deflected.

SUMMARY

The present disclosure overcomes the problems and disadvantages associated with current strategies and designs and provides new devices and methods for connecting bell and spigot pipeline components.

An embodiment of the disclosure is directed to a conduit that comprises at least one bell with an end face, an internal portion, and a concave inner surface between the end face and the internal portion. The diameter of the inner surface adjacent to the internal portion is greater than the diameter of the inner surface adjacent to the end face.

In preferred embodiments, the inner surface is a truncated elliptic paraboloid. In preferred embodiments, the conduit has a bell at a first end and a spigot at a second end. Preferably, the conduit is cylindrical and is made of at least one of ferrous metals (e.g., steel and cast iron, among others), non-ferrous metals, copper-based alloys, or plastic (e.g. PVC or HDPE).

Another embodiment of the disclosure is also directed to a conduit that includes multiple openings wherein at least one opening has a bell that couples to another piping component having a spigot. In preferred embodiments, the inner surface of the bell is concave. The inner surface is preferably a truncated elliptic paraboloid. In preferred embodiments, the conduit has a bell at a first end and a spigot at a second end. Preferably, the conduit is cylindrical and is made of at least one of ferrous metals (e.g., steel and cast iron), non-ferrous metals, copper-based alloys, or plastic (e.g. PVC or HDPE).

Another embodiment of the disclosure is directed to a sealing device. The sealing device comprises at least one segment having a convex outer surface, and a K-type gasket coupled to the segment. In the preferred embodiments, the segment is a locking segment. The locking segment functions as a restraining device and an anti-extrusion device to prevent the joint from separating and the elastomeric seal from being extruded out of the joint when subjected to high internal hydraulic forces. In other embodiments, a guide segment without teeth is substituted for the locking segment and serves as an anti-extrusion device for the polymeric material of the sealing portion.

In preferred embodiments, the segment is of a first material and the K-type gasket is of a second material. In preferred embodiments, the K-type gasket is comprised of a coupling section and a sealing section. The sealing section is preferably comprised of an upper section and a lower section, each extending from the coupling section. The coupling section, in preferred embodiments, has one or more expansion or contraction grooves in the outer or inner periphery.

The locking segment, in preferred embodiments, has at least one engagement device. Preferably, the device is annular.

Another embodiment of the disclosure is directed to a conduit coupling system. The system comprises at least two piping components and a sealing device. A first component has a bell and a second component has a spigot, the spigot is adapted to mate with the bell. The bell includes a first end and a second end, wherein the first end is coupled to the first component. The bell socket has a concave annular inner surface and a diameter of the annular inner surface adjacent to the first end of the bell socket is greater than a diameter of the annular inner surface adjacent to the second end of the bell socket. The sealing device includes a segment comprising a convex outer surface and a K-type gasket coupled to the segment. The sealing device is adapted to fit between the bell socket and the spigot end.

In preferred embodiments, the segment is a locking segment. Each locking segment is adapted to engage an outer surface of the spigot. The inner surface of the bell socket is preferably a truncated elliptic paraboloid. Each component preferably comprises a bell at a first end and a spigot or bell at a second end and each component is cylindrical. Each component can be made of ferrous metals (e.g., steel and cast iron), non-ferrous metals, copper-based alloys, or plastic (e.g. PVC or HDPE).

In preferred embodiments, the locking segment is of a first material and the K-type gasket is of a second material. Preferably, the first material is harder than the material of the spigot. In preferred embodiments, the K-type gasket has a coupling section and a sealing section. The sealing section is preferably comprised of an upper section and a lower section, each extending from the coupling section. Preferably the locking segment has at least one engagement device. In preferred embodiments, the sealing device is annular.

Another embodiment of the disclosure is a method of coupling at least two conduits. The method includes the steps of positioning a sealing device inside a bell coupled to one end of a first conduit, inserting a spigot of a second conduit through the sealing device inside the bell, and partially removing the spigot from the bell. A locking segment of the sealing device engages the outer surface of the spigot as the spigot is partially removed from the bell. The sealing device is adapted to move axially within the bell in the direction of the insertion of the spigot and the movement is assisted by the presence of expansion and contraction grooves in the coupling section of the gasket. This movement allows the locking segment to be displaced from the path of the incoming spigot with little increase in insertion force. The axial movement may be confined to one segment of the sealing device to accommodate angular and radial misalignment of the incoming spigot. The sealing device is adapted to move in the direction of the partially removed spigot from the bell in response to internal hydraulic pressure to effect a seal to the spigot that rests in an angular and radial misaligned position.

In preferred embodiments, the bell has a first end and a second end. The first end is coupled to the first conduit. The bell has a concave annular inner surface, and a diameter of the annular inner surface adjacent to the first end of the bell socket is greater than a diameter of the annular inner surface adjacent to the second end of the bell socket.

In certain embodiments, radial loading of the locking segment increases as the spigot is removed from the bell. The radial loading of the locking segment can increase exponentially as the segment moves toward the front of the bell following the parabolic curve toward the vertex. Preferably, the sealing device includes at least one locking segment comprising a convex outer surface, and a K-type gasket coupled to the locking segment. Preferably the K-type gasket is compressed upon insertion of the spigot. The withdrawal of the spigot end can be due to external forces or internal hydraulic forces.

Other embodiments and advantages are set forth in part in the description, which follows, and in part, may be obvious from this description, or may be learned from practice.

DESCRIPTION OF THE DRAWINGS

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

As embodied and broadly described herein, the disclosures herein provide detailed embodiments of the disclosed system, device, and method. However, the disclosed embodiments are merely examples that may be embodied in various and alternative forms. Therefore, there is no intent that specific structural and functional details should be limiting, but rather the intention is that they provide a basis for the claims and as a representative basis for teaching one skilled in the art to variously employ the principles of the present disclosure.

A problem in the art capable of being solved by the disclosed embodiments is coupling piping components and maintaining the assembly. It has surprisingly been discovered that certain configurations of the interior surface of a bell socket increase ease of assembly and allow for deflection between components. Furthermore, it has surprisingly been discovered that certain configurations of the outer surface of a gasket increase the gasket's ability to maintain assembly during use of the components including under high pressure applications.

Figure 1:
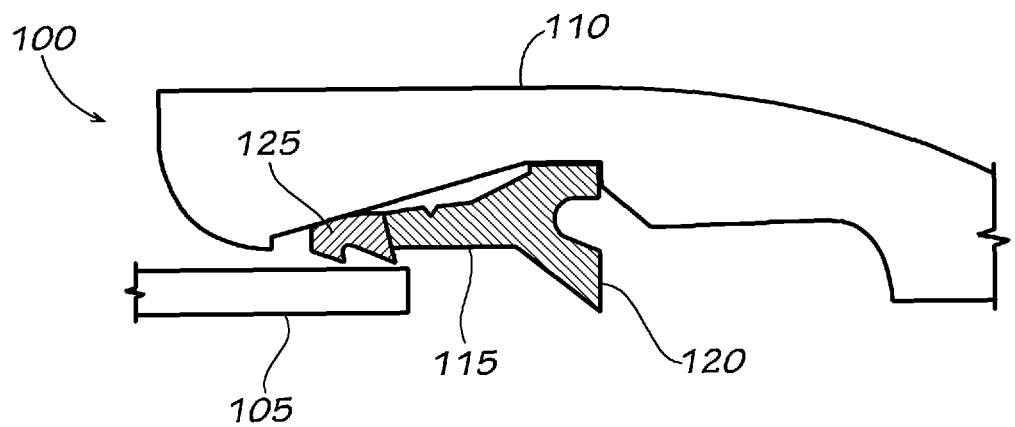
FIG. 1 is a partial cross-sectional view of an embodiment of a system in accord with one embodiment of the current disclosure.

FIG. 1 depicts a cutaway view of the components of the upper segment of system 100. System 100 includes a spigot 105, a bell 110, and a sealing device 115. Each of spigot 105, bell 110, and sealing device 115 is shown in partial cross-section. In the preferred embodiment, each of spigot 105, bell 110, and sealing device 115 is annular in shape having a common axis below FIG. 1. Each of spigot 105, bell 110, and sealing device 115 can have any diameter that may be commonly found in piping systems. Preferably the diameter of each of spigot 105, bell 110, and sealing device 115 is between one-half inch and one hundred and twenty inches, more preferably between one-half inch and seventy two inches.

In a preferred embodiment, system 100 is used to join lengths of pipes. The pipes can be of any length. Additionally, one pipe can have one spigot end and one, bell end, two spigot ends, two bell ends, or a combination thereof. In other embodiments, there can be at least one spigot and/or bell located along the length of the pipe positioned perpendicularly or at an angle to the axis of the pipe. In other embodiments, system 100 can be used to join two or more pipes to other components (e.g. fire hydrants, valves, and/or fittings), or can be used to join components together. System 100 can be used for any fluid, including gas, water, or oil, for example. In the preferred embodiment, sealing device 115 has a gasket end 120 and a locking segment 125. However, in certain embodiments, segment 125 can be an anti-extrusion element.

In the preferred embodiment, spigot 105 is made of ductile iron, steel, or plastic and segments 125 are made of gray iron, ductile iron, steel, or hardened plastic. However other material may be used, preferably but not limited to ferrous metals (e.g. steel and cast-iron), non-ferrous materials, copper based alloys, or plastic (e.g. PVC or HDPE). Pipes can have walls of any thickness, preferably, but not limited to, between ⅛ inch and 1¼ inches. Fittings can have walls of any thickness, preferably, but not limited to, between ¼ inch and 2 inches.

In the preferred embodiment, sealing device 115 is of a diameter larger than spigot 105 and has an annulus at the back with a diameter slightly smaller than the diameter of spigot 105. The sealing device 115 is preferably dimensioned such that spigot 105 can be inserted into sealing device 115 without encountering intentional resistance until such time as it reaches the inner end of bell 110, insertion forces are reduced by several orders of magnitude compared to compression type seals, if resistance is encountered during insertion as between the spigot 105 and a locking segment 125, the plasticity of the gasket, assisted by a compression groove 330 (shown in FIG. 3), the segment 125 is able to reduce the resistance by moving up and away from contact with the spigot 105.

Figure 2:
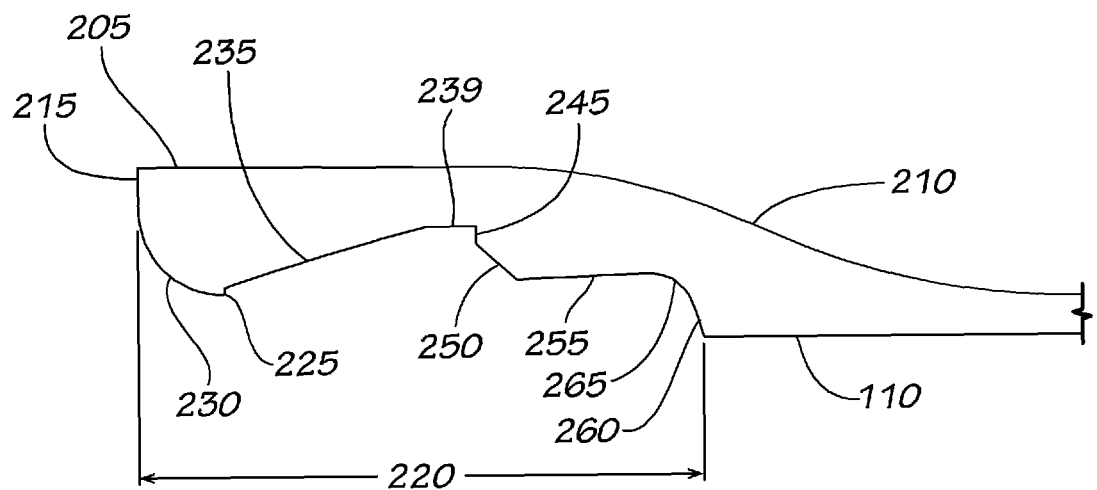
FIG. 2 is a partial cross-sectional view of an embodiment of a bell of the system of FIG. 1.

FIG. 2 depicts a cut away view of the upper segment of bell 110. Bell 110 is preferably a push-on style bell. Bell 110 includes an outer diameter 205, a bell chime 210 (to which the pipe or other component is coupled), a bell face 215 at the open end of bell 110, and a bell socket 220 (through which spigot 105 enters bell 110). In the preferred embodiment, bell 110 and the piping component is one unit, however in other embodiments, bell 110 can be coupled to the piping component by any other method known in the art, including, but not limited to, threading and screwing, welding, adhesive, fastening devices, and friction fitting. Bell 110 preferably has an outer diameter larger than the outer diameter of the piping component, however in other embodiments bell 110 can have an outer diameter equal to or smaller than the outer diameter of the piping component.

Bell face 215 is coupled to bell socket 220 by bell throat 225. The radius 230 between bell face 215 and bell socket 220 can have any diameter. Preferably, radius 230 is adapted to facilitate insertion of spigot 105 into bell 110. In the preferred embodiment, bell socket 220 has an annular inner surface 235 starting at bell throat 225 and ending at gasket heel seat 239 into which sealing device 115 fits, in the preferred embodiment, inner surface 235 is concave and has a diameter adjacent to gasket heal seat 239 that is greater than a diameter of inner surface 235 adjacent to bell throat 225. However, in other embodiments the diameter at bell throat 225 may be equal to or smaller than the diameter gasket heel seat 239. Preferably, the decrease in diameter from gasket heal seat 239 to bell throat 225 is at a rapidly increasing rate. The cross-section of inner surface 235 can have any shape, including but not limited to a truncated cone, a truncated elliptic paraboloid, a truncated sphere, or a combination thereof. Paraboloids are surfaces generated by rotating a parabola about its central axis. Preferably, the curve of inner surface 235 has a nose or "vertex" of a paraboloid aligned in an axial direction opening away from the "directrix" of the paraboloid.

Gasket heel seat 239 and socket shoulder 245 mate with and retain sealing device 115 (described herein). In the preferred embodiment, adjacent to socket shoulder 245 is clearance slope 250. Clearance slope 250 provides clearance for lip seal 335 (shown in FIG. 3) to move out of the way of an inserted spigot, and permits passage of the water or other fluid into a pressure annulus groove 340 of sealing device 115 (shown in FIG. 3). In the preferred embodiment, the inner portion of bell socket 220 is land 255, which extends from clearance slope 250 to land stop 260. Land 255 provides clearance for spigot 105 and limits overdeflection of the joint. Land stop 260 limits the insertion depth of spigot 105, while land radius 265 assists in casting by eliminating a sharp inner corner between land 255 and land stop 260.

Figure 3:
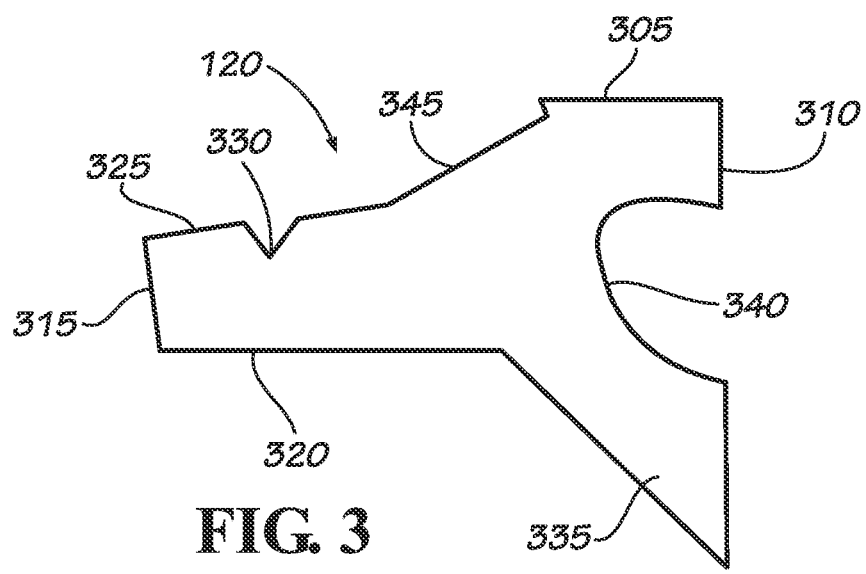
FIG. 3 is a partial cross-sectional view of an embodiment of a gasket of the system of FIG. 1.

FIG. 3 depicts a cut away view of the upper segment of gasket 120 of sealing device 115. Gasket 120 is preferably made of an elastomer. However, other materials that are flexible, appropriate for the fluid, and provide a tight seal can be used. For example, gasket 120 can be made of SBR (Styrene butadiene rubber), EPDM (ethylene propylene diene monomer rubber), Nitrile, NBR (Nitrile butadiene rubber), and/or other synthetic and natural rubbers. In the preferred embodiment, gasket 120 is of a single durometer rubber. However, in other embodiments, two or more durometer rubbers can be used. Gasket 120 is preferably a K-type, lip, or wiper seal design, conforming to and fitting within the bell 110. Gasket heel 305 and gasket shoulder 310 mate with gasket heel seat 239 and socket shoulder 245 (as described with respect to FIG. 2). In the preferred embodiment, gasket heel 305 is slightly larger than gasket heel seat 239, thereby compressing gasket heel 305 so that it is firmly anchored in bell socket 220 with gasket shoulder 310 against socket shoulder 245. Due to this configuration, gasket 120 is anchored within bell 110 at the inner portion of the joint, away from throat 225, thereby allowing gasket 120 to move inward during insertion of spigot 105.

Front edge slope 315 is the surface to which the locking segment or anti-extrusion segment is coupled. In the event that the edge of spigot 105 contacts the segment 125, in the preferred embodiment, front edge slope 315 is angled such that segment 125 and gasket 120 will be deflected outward and away from spigot 105, allowing the passage of spigot 105 through gasket orifice 320. The primary translation slope 325 assists in stabilizing the front portion of gasket 120 and transferring forces to the expansion and contraction groove 330, which will bend and/or buckle to assist in the movement out of the path of an inserted spigot 105 until spigot 105 comes into contact with the front edge of lip seal 335. In the preferred embodiment, expansion and contraction groove 330 is an annular cutout along the outer surface of gasket 120. However, in other embodiments, expansion and contraction groove 330 can be located on the inner surface of gasket 120. In other embodiments, there can be multiple expansion and contraction grooves located at various locations about gasket 120. Furthermore, expansion and contraction groove 330 can have any cross-sectional shape, including but not limited to triangular, rectangular, trapezoidal, and semicircular. The back edge of gasket 120 contains a circumferential groove or pressure annulus pocket 340. Hydraulic pressure against pressure annulus groove 340 increases the sealing pressure of lip seal 335 against the mating spigot 105.

Figure 4:
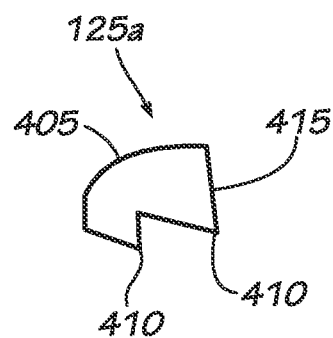
FIG. 4 is a partial cross-sectional view of an embodiment of a locking segment of the system of FIG. 1.

FIG. 4 depicts a cutaway view of the upper segment of segment 125, where segment 125a is a locking segment. Segment 125 is preferably made of AISI type 4140 steel (chromium steel). However other hard and durable materials can be used, for example AISI type 431 stainless steel. In preferred embodiments, segment 125 may be coated with an anticorrosion coating. The outer surface 405 of locking segment 125a is preferably a curved surface that makes contact with the concave inner surface 235 of bell socket 220. In the preferred embodiment outer surface 405 is convex, more preferably a truncated paraboloid. However, in other embodiments, outer surface 405 can be another convex surface, a linear surface, or a concave surface. Preferably outer surface 405 opens away from bell throat 225. Movement of outer surface 405 against the inner surface 235 of bell socket 220 facilitates locking segment 125a in wedging between bell socket 220 and spigot 105, forcing the teeth 410 of locking segment 125a into the outer surface of spigot 105 and providing restraint against extraction of spigot 105. While locking segment 125a is shown with two teeth 410, one or more teeth can be used. For thin walled spigots or PVC spigots, there should be more, shallower teeth 410 located closer together than in embodiments using thick wall iron spigots. Additionally, in the preferred embodiment, for thin walled spigots or PVC spigots, there should be more segments located closer together than in embodiments using thick wall iron spigots.

Due to the elasticity of the gasket 115 (being elastomeric), locking segments 125a have freedom to move to maintain contact between outer surface 405 and the inner surface 235 of bell socket 220. Thus, segment 405 can accommodate misalignments between the two surfaces caused by, for example, casting variability in the bell 110, as well as a differential caused by the elliptical path of the locking segments 125a during deflection not matching exactly to inner surface 235.

Another function of locking segments 125a is to assist in moving gasket 120 away from spigot 105 as spigot 105 is inserted into bell 110. Segment mounting slope 415 is angled such that the corresponding mating front end slope 315 of gasket 120 will help deflect gasket 120 up and away from the path of spigot 105 so that passage is not impeded. Locking segment 125a is aided by primary translation slope 325 of gasket 120, which supports the portion of gasket 120 forward of expansion and contraction groove 330.

In the preferred embodiment, segments 125 are equally spaced and mounted to front end slope 315 of gasket 120. Segments 125 reinforce the elastic gasket material against extrusion between throat 225 and spigot 105. In order for segment teeth 410 to penetrate spigot 105, it is preferable for locking segment 125a to be made of a material harder than spigot 105.

Figure 5:
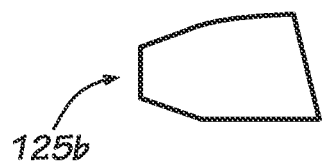
FIG. 5 is a partial cross-sectional view of an embodiment of an anti-extrusion segment of the system of FIG. 1.

FIG. 5 depicts a cutaway view of the upper segment of segment 125, where segment 125b is an anti-extrusion segment for non-restraining joint gaskets. In embodiments were restraint between a mating bell 110 and spigot 105 is not desired or needed, segment 125b can be made without teeth as shown in FIG. 5. The toothless segment 125b functions similarly to the locking segment 125a in helping gasket 120 to facilitate deflection and preventing extrusion of gasket 120 between throat 225 of bell socket 220 and spigot 120, but has no teeth to penetrate spigot 105 and provide restraint. In some embodiments, both locking segments 125a and toothless segments 125b can be used in the same restraining device 115. In some embodiments, non-restraining segments such as segment 125l may be replaced by an extended gasket, wherein a portion of the extended gasket extends into the space normally occupied by segments 125, although the portion is typically annular and not segmented. Typically, such portion approximates the size and shape of segment 125 but is made of gasket material. In such embodiments, greater deflection may be seen, as there is no metallic segment 125 to provide resistance to deflection. Additionally, the portion provides an additional sealing surface, as the portion extending is typically annular. Also, a visual distinction between segmented restraining bell joints and the extended gasket bell joints make it easier for field workers to identify the different joints by visual inspection. Finally, the extended gasket bell joints do not require the inclusion of segments, which reduces material costs and tooling costs.

Figure 6:
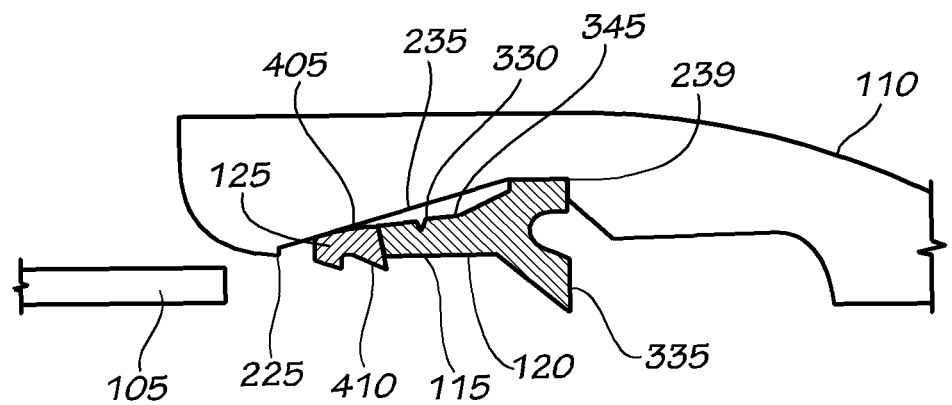
FIG. 6 is a partial cross-sectional view of an embodiment of the system of FIG. 1 with the spigot prior to insertion into the bell.
Figure 7:
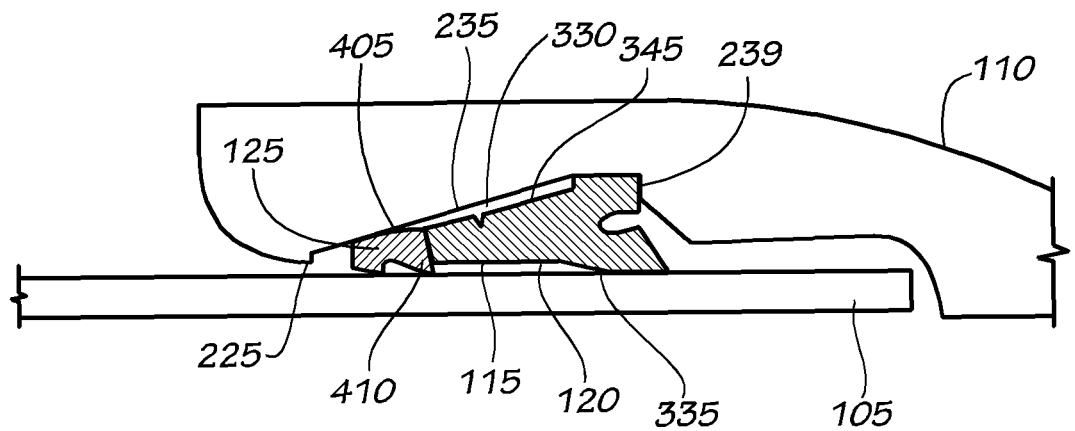
FIG. 7 is a partial cross-sectional view of an embodiment of the system of FIG. 1 with the spigot inserted into the bell.

FIG. 6-9 depict cutaway views of the steps of inserting spigot 105 through sealing device 115 and into bell 110. In FIG. 6, spigot 105 is aligned with bell 110. In the preferred embodiment, the centerline of spigot 105 is aligned with the center line of bell 110. However, in other embodiments, spigot 105 can be inserted into bell 110 at an angle. The angle can be less than 15°. Preferably, the angle is less than 10°. Upon contact and continued insertion of spigot 105 (as shown in FIG. 7), lip seal 335 will stretch over spigot 105 imparting axial and circumferential tensile forces to gasket 120, causing the activation of secondary translation slope 345 in bringing segments 125 into contact with spigot 105.

Figure 8:
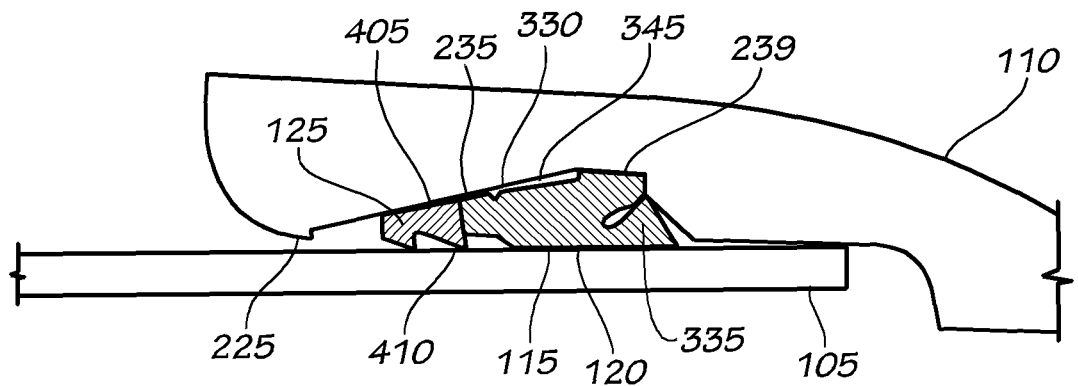
FIG. 8 is a partial cross-sectional view of an embodiment of the system of FIG. 1 with the gasket compressed more on the upper side due to deflection of the spigot.

In 8 inch pipe, for example, preferably, less than 100 pounds of force are used to insert the spigot 105 into the bell 110, more preferably less than 50 pounds of force are used, and even more preferably less than 25 pounds of force are used. In the preferred embodiment, the insertion can be completed manually, without the use of mechanical devices other than to lift the piping component. Insertion of spigot 105 through sealing device 115 will result in spigot 105 contacting locking segment 125. The geometries of the concave inner surface 235 and outer surface 405 of segment 125 aided by material characteristics of gasket 120 and the expansion and contraction groove 330 in gasket 120 allow and guide the translation of segment 125 out of the way of incoming spigot 105 with a minimum force. The translation vector is a combination of axial and radial movement in response to the orientation of the incoming spigot 105 and dimensional variations of the joint components. The translation can include off-axis rotation of segment 125 in response to spigot 105 being deflected or offset. The energy stored in gasket 120 as a result of the translation keeps segment 125 in contact with spigot 105. Insertion of spigot 105 through sealing device 115 induces axial tensile forces in sealing device 115, or at least positions segment 125 to better engage spigot 105 when there is a withdrawal of spigot 105 from bell 110 (as shown in FIG. 8). The circumferential tensile forces exerted on lip seal 335 form a seal between lip seal 335 and spigot 105. The seal is amplified when the joint is pressurized and the material of gasket 120 causes the seal to be pressed more tightly against spigot 105 and the inner surface of bell 110 (as shown in FIG. 8). Gasket 120 can move independently of segment 125 once segment 125 is seated. Furthermore, since, in the preferred embodiment, bell 110 is shaped such that the diameter decreases at an increasing rate from gasket heel seat 239 to bell throat 225, the cavity between bell 110 and spigot 105 allows gasket 120 to deform and move while the joint is pressurized, thereby aiding in preventing the gasket from blowing out of the joint. Spigot 105 does not have to be fully inserted into bell 110 to seal. In the preferred embodiment, spigot 105 will be sealed once the inserted end of spigot 105 is inserted past lip seal 335.

Figure 9:
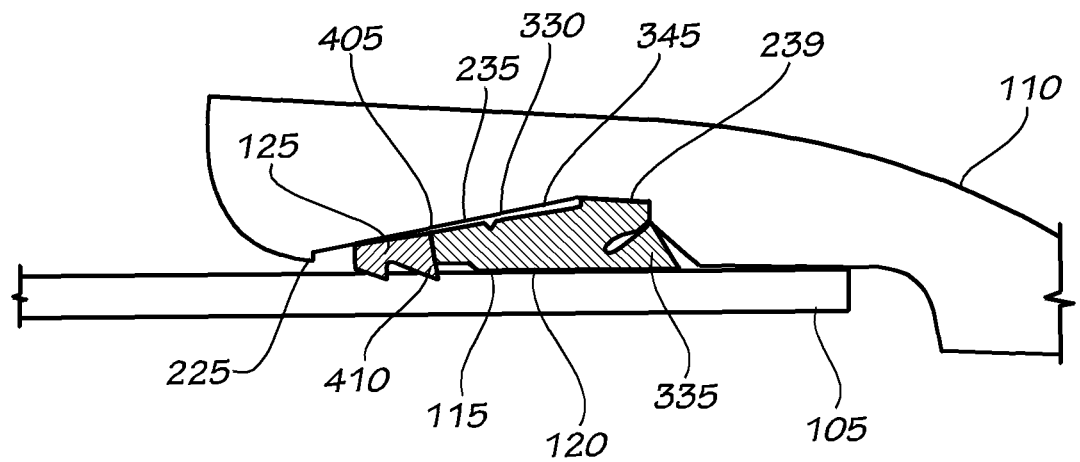
FIG. 9 is a partial cross-sectional view of an embodiment of the system of FIG. 1 with the locking segment engaged.

As shown in FIG. 9, retracting spigot 105 from bell 110, either from external forces or by internal pressure in the pipeline, causes the teeth 410 to engage spigot 105 due to radial loading caused by the outside surface of the segments bearing against the progressively decreasing curved inner surface 235 of bell 110 and forces teeth 410 into spigot 105. Since, in the preferred embodiment, bell 110 is shaped such that the diameter decreases at an increasing rate from gasket heel seat 239 to bell throat 225, withdrawal of the spigot is met with increasing resistance as the similarly formed outer surface 405 of segments 125 is wedged between the bell 110 and the mating spigot 105. The flexibility that allows segment 125 to translate out of the path of the incoming spigot 105 also allows segment 125 to rotate into an off-axis position to maximize the engagement of teeth 410 with a misaligned or radially offset spigot 110 and to reduce the possibility of point-loading conditions. In the preferred embodiment, segments 125 are able to rotate within the confines of the bell 110 and spigot 105 and settle in a position that minimizes stress.

When the joint is extended (pulled apart), the outer surface 405 of locking segment 125 mates with the inner surface 235 of bell socket 220 and forces teeth 410 into the outer surface of spigot 105 due to the parabolic wedging action of the outer surface of locking segment 125 being drawn in the direction of its vertex. Withdrawal of spigot 105, either due to external forces or the internal hydraulic action caused by pressurizing the joint, causes teeth 410 to engage spigot 105 and the convex outer surface 405 of locking segment 125 to engage the corresponding concave inner surface 235 of bell socket 220. As the withdrawal motion is continued, the engagement between the outer surface 405 of locking segment 125 and inner surface 235 is intensified by the increasingly smaller diameter of bell socket 220. This increases the inward radial loading on teeth 410, forcing them further to engage spigot 105. Extension of the joint is minimized due to the outer surface of locking segment 125 encountering an exponentially decreasing diameter of the inner surface 235 during pull-back, which exponentially increases the rate of radial loading of teeth 410 engaging spigot 105. In embodiments where there are multiple locking segments 125, the engagement pressure on the outer surface of locking segments 125 would be relatively equal since bell 110 and spigot 105 are in the form of concentric circles when axially aligned.

Figure 10:
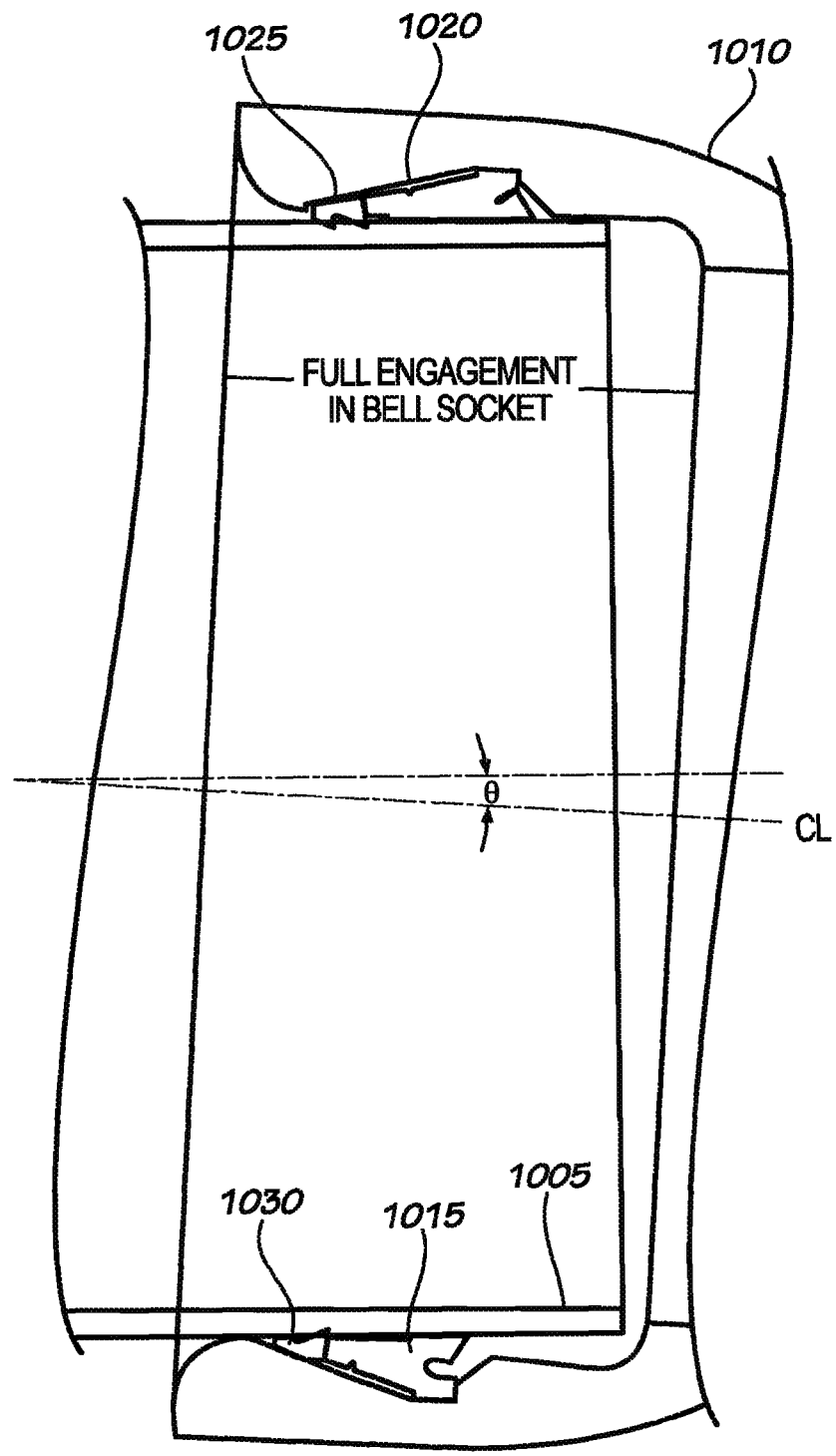
FIG. 10 is a cross-sectional view of an embodiment of the system of FIG. 1 with the spigot deflected within the bell.

FIG. 10 depicts a cross-sectional view of a spigot 1005 coupled to a bell 1010 deflected at an angle θ. The outer surface of segment 1025 facilitates a deflection, or bending, of the joint between spigot 1005 and bell 1010 by moving along inner surface 1020 of bell 1010. If θ is defined as the angle of deflection as measured from the centerline CL of the bell 1010 and spigot 1005 components, then in the direction of deflection, segment 1025 will move along curve 1020 in the direction of the vertex, or smaller end of curve 1020. At the other end of the coupling, in the opposite direction away from deflection, the opposing segment 1030 will move along the curve 1020 away from the vertex. Segments mounted around the gasket 1015 at intermediate locations between segment 1025 and segment 1030 will follow an elliptical path. The outer surfaces of these intermediate segments will maintain contact with the concave inner surface 1020 of bell 1010 due to the continuously changing shape of inner surface 1020. The interface between the parabolic shapes of curve 1020 and the outer surface of segment 1025 allow uniform loading of gasket 1015 and consistent engagement of segments 1025 throughout the joint. The major axis of the elliptical path can be defined by h=tangent (θ) times the effective diameter as measured across the outside surface of opposing segments. In the preferred embodiment, θ is less than or equal to 15°. More preferably θ is less than or equal to 10°; however, θ can be another angle.

In the preferred embodiment, when the joint is deflected, the outer surface of locking segment 125 follows a curve described by an ellipse in a plane inclined to the axis of the spigot. Each half of the ellipse on either side of the minor axis is a curve close enough in shape to a parabola so that the ellipse conforms closely to the paraboloid of bell 110 as the joint is deflected.

In the preferred embodiment, the inner surface 235 of bell 110 and the outer surface 405 of segment 125 follow the shape of truncated paraboloids, one positioned inside the other. The two paraboloids are axially aligned when the joint is in the undeflected position.

In the preferred embodiment, no lubrication between spigot 105 and sealing device 115 is required. However, in other embodiments, lubricants can be applied to the inner surface of sealing device 115, the outer surface of spigot 110, or both. Preferably the lubricant is a dry film lubricant. The lubricant can ease in assembly and/or provide corrosion protection to sealing device 115. Preferably, only a minimum amount (below industry standards) of lubricant is used.

The following examples illustrate embodiments of the current disclosure but should not be viewed as limiting the scope of any claims flowing therefrom.

EXAMPLE

An experiment using two lengths of 8 inch pipe was conducted. One pipe had a bell as described herein while the other had a spigot as described herein. The two lengths were joined using a sealing device as described herein. The pipes were sealed at their respective open ends and the internal cavity was pressurized. The experiment was conducted first with the pipes having no deflection and then with the pipes having 5.7° of deflection. The results are compiled in Table 1.

| Test Number | No. of Segments | Joint Deflection, ° | Minimum Pressure, psi | Pressure at Failure, psi | Failure Mode |
|---|---|---|---|---|---|
| 1 | 8 | 0 | 700 | 772 | Gasket Tear |
| 2 | 8 | 0 | 700 | 771 | Gasket Tear |
| 3 | 14 | 0 | 700 | 1192 | Gasket Tear |
| 4 | 10 | 0 | 700 | 998.5 | Gasket Tear |
| 5 | 10 | 5.7 | 700 | 828.2 | Gasket Tear |
| 6 | 14 | 7.5° | 700 | 1028 | Gasket Tear |

If "θ" is defined as the angle of deflection between the axis of the bell socket 1010 and the spigot 1005, through moderate angles of deflection, the locking segments 1025 following the major axis of an ellipse projected onto a plane inclined perpendicular to the axis will, on the side of the complementary angle (180°−θ) be positioned nearer the vertex of the paraboloid of the bell socket 1010, and those on the corresponding angle of deflection, θ, corresponding to the longer side of the major axis of the ellipse will follow the curve of the paraboloid and be positioned further out on the major axis, but still in close proximity to the bell socket 1010. Thus the elliptical path of the deflected segments 1025 rotating within the paraboloid helps maintain proximity between the paraboloid outside surfaces of the locking segments 1025 and the paraboloid surface of the bell socket 1010 through moderate angles of deflection within the limits of the joint. At the center of rotation (during deflection), the segments 1025 are not displaced much beyond that of their original position on the circle perpendicular to the axis of the spigot 1005. The displacement or translation of the segments 1025 includes the ability to rotate into an off-axis position to improve the engagement with a misaligned spigot 1005 and to provide equalization of pressure between the bell curve and the spigot end through the segments 1025. Thus, the engagement pattern of the segments 1025 is approximately balanced around the spigot 1005 whether deflected or not through moderate angles of deflection of the joint.

Figure 11:
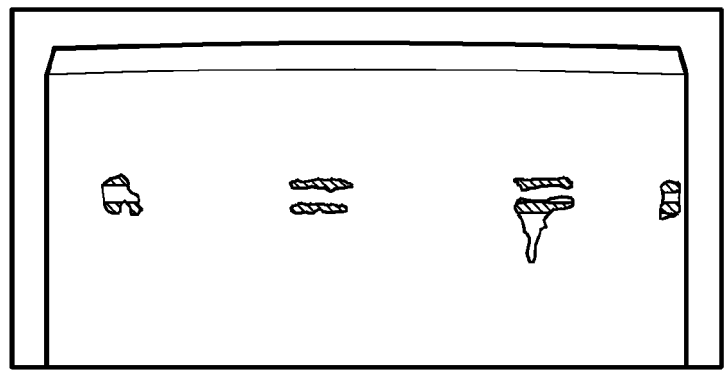
FIG. 11 is a picture of an experimental engagement pattern.
Figure 12:
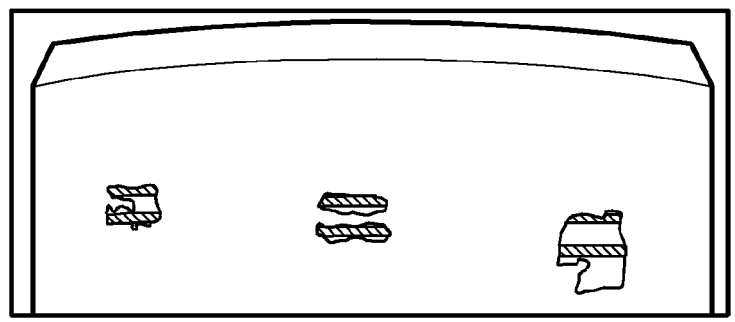
FIG. 12 is a picture of an experimental engagement pattern.
Figure 13:
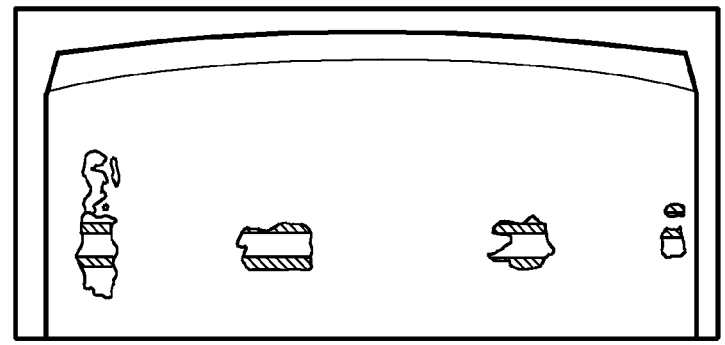
FIG. 13 is a picture of an experimental engagement pattern.

The validity of this assertion can be seen by the engagement pattern of segment teeth of a gasket on a pipe spigot 1005 as shown in FIGS. 11-13 for a joint that was deflected 5.7°, and pressurized to 828.2-psi before the gasket body ruptured. It can be seen that the engagement pattern follows an elliptical path about the pipe spigot 1005, and the depth of penetration of the teeth are very close, indicating relatively equal pressures between the bell socket 1010, segments 1025, and spigot 1005, even though the joint is deflected. Furthermore, segments rotated up to and beyond 30° during deflection. The joint in the photographs withstood a pressure of 828.2-psi before failure of the prototype gasket made of a catalyst-activated polyurethane. A molded SBR or EPDM vulcanized rubber would be considerably stronger and would be expected to withstand greater pressure before failure. Even thought the gasket rubber failed, the joint maintained engagement and did not separate. In each of the tests, the joints did not separate; all failures were due to the weakness of the castable urethane of the lab prototype gaskets.

Figure 14:
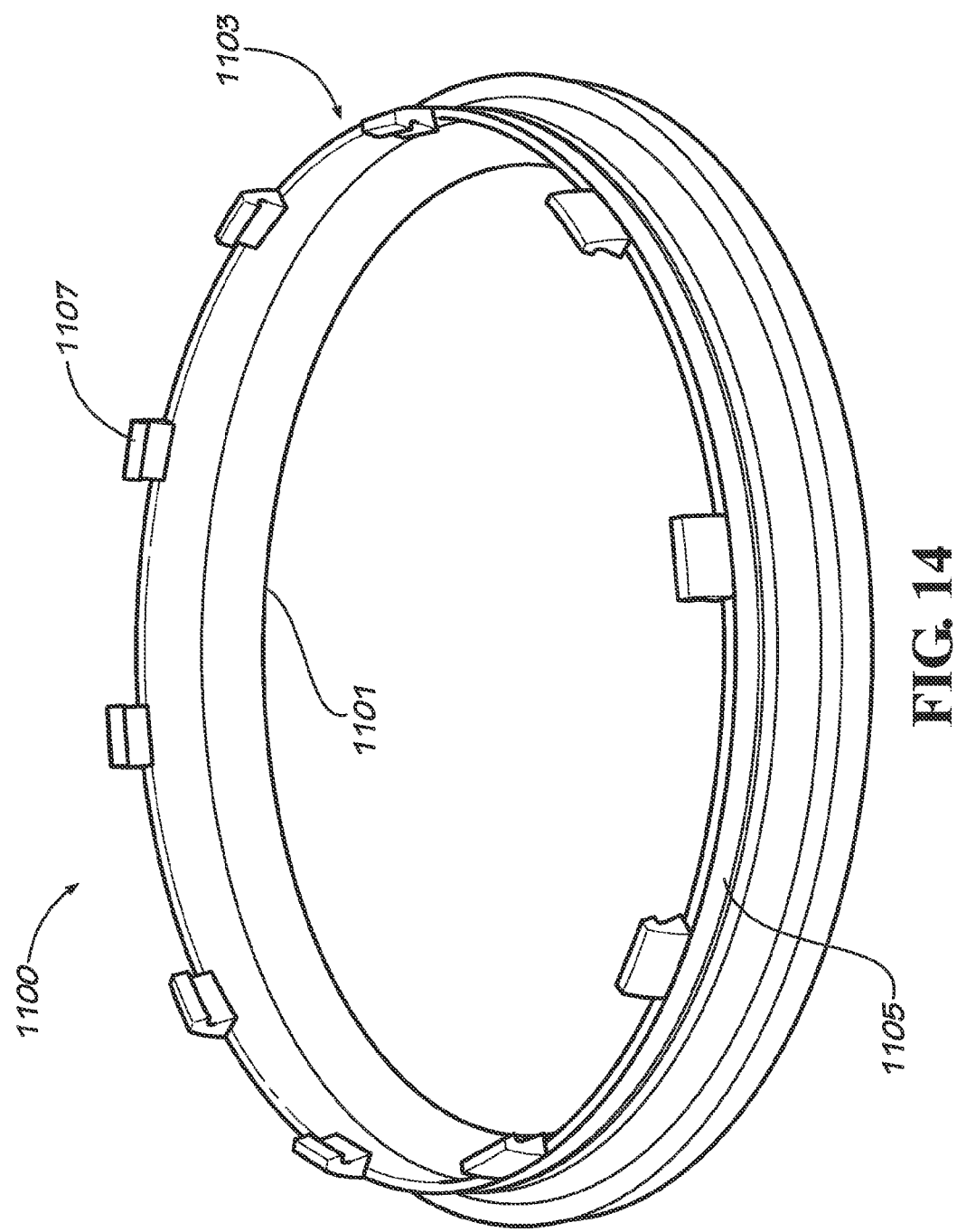
FIG. 14 is a perspective view a gasket in accord with one embodiment of the current disclosure.

Illustrated in FIG. 14 is an embodiment of an annular elastomeric gasket assembly 1100. The gasket assembly 1100 has an annular body 1101 having an outer section 1103 with at least one groove 1105 in the outer circumference of the outer section 1103. Coupled to the outer section 1103 are a plurality of substantially rigid members 1107.

Figure 15:
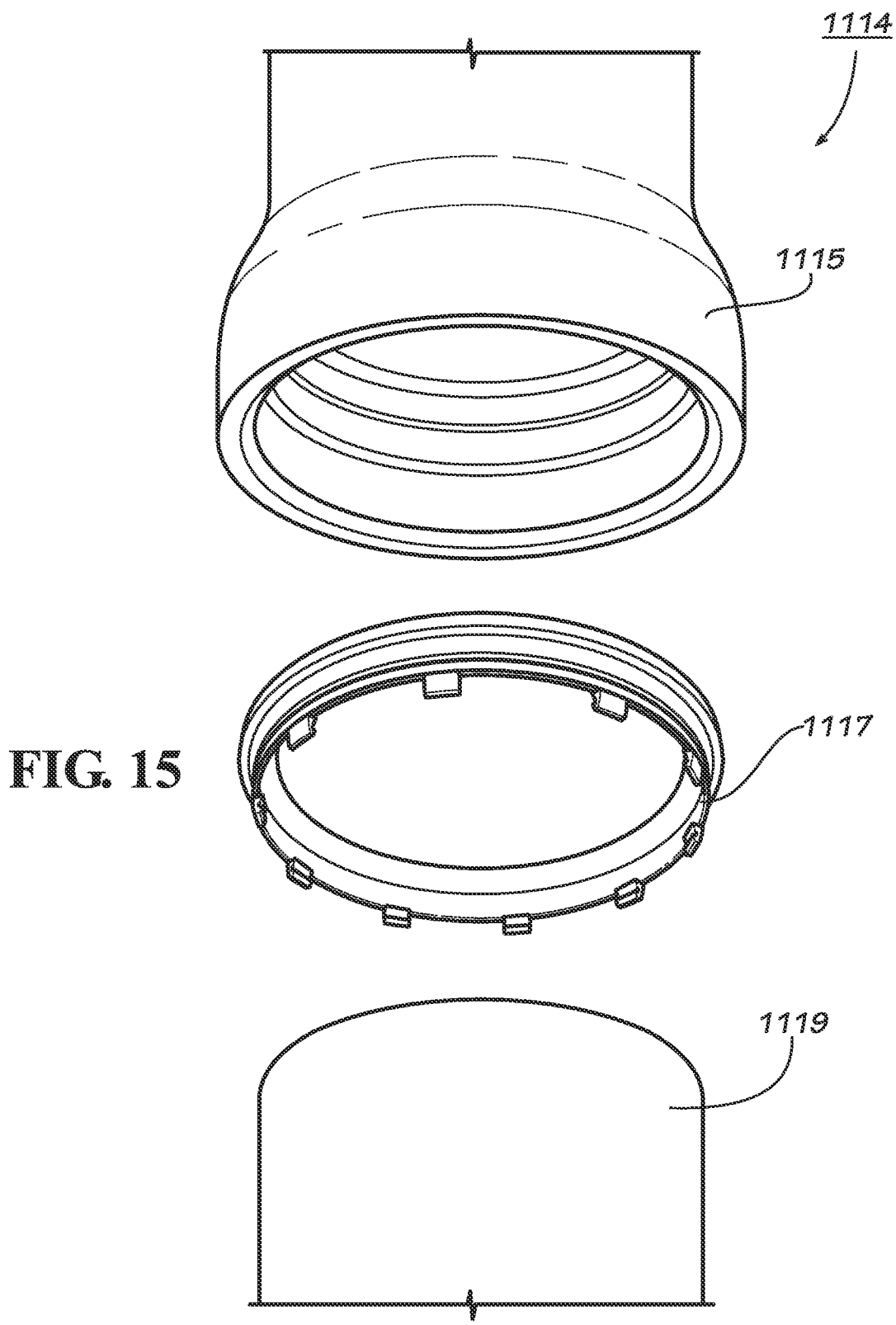
FIG. 15 is a blow-out view of a bell, spigot, and gasket in accord with one embodiment of the current disclosure.

FIG. 15 illustrates the components of a system 1114 for sealing a spigot and a bell, including the bell 1115, the gasket 1117, and the spigot 1119. As stated with regard to the previous embodiment the gasket 1117 is seated into the inner portion of the bell 1115 in the manner previously described.

Figure 16:
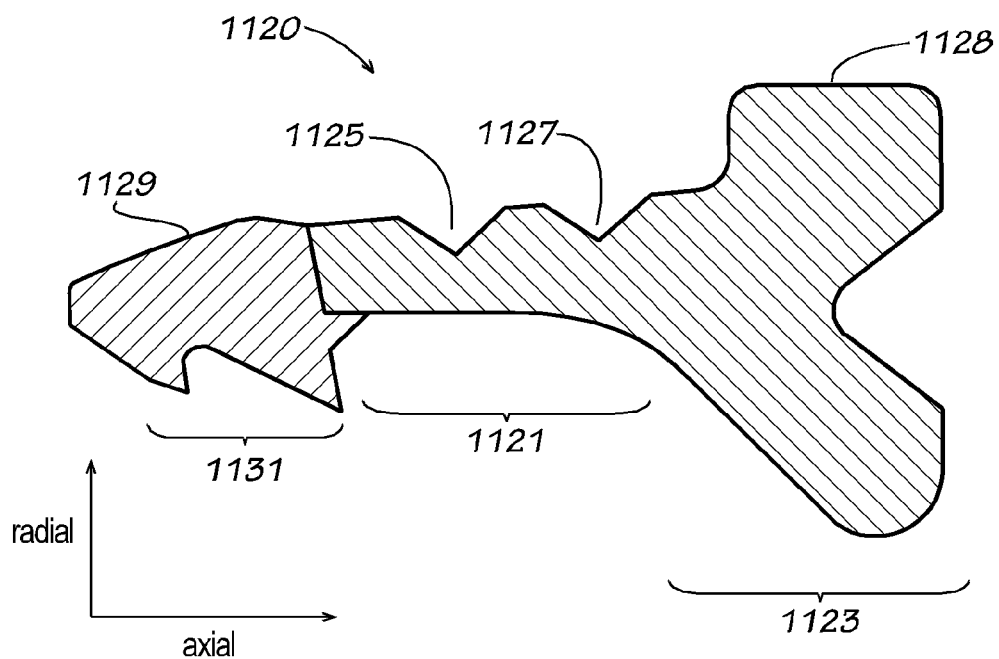
FIG. 16 is a cross-sectional view of a gasket in accord with one embodiment of the current disclosure.

Illustrated in FIG. 16 is a cross-section of an embodiment of a gasket 1120. A gasket 1120 has a first section 1121 and a second section 1123. Illustrated in FIG. 16 are two grooves 1125 and 1127, and gasket heel 1128. Attached to the front of the gasket 1120 is a substantially rigid member 1129. The purpose of the grooves 1125 and 1127 are to allow the first section 1121 to flex, thereby allowing the displacement of the front edge of the first section to be displaced in an axial and radial direction when the spigot 1005 is inserted. This displacement allows the substantially rigid member 1129 to move along the inner surface of the bell 1010 (i.e. out of the way of the outer surface of the spigot 1005) so as to reduce the friction generated between the substantially rigid member 1129 and the spigot 1005. Other ways of enabling the incurvation of the first section 1121 of the gasket 1120 may be used. For example, the first section 1121 may be made of a more flexible material than the second section 1123. The first section 1121 and the second section 1123 may be separate pieces coupled together in a flexible manner. Alternately, the first section 1121 may be provided with holes in the interior of the first section 1121, as a means of incurvating the first section 1121.

The substantially rigid members 1129 transfer the forces generated by the friction of the insertion of the spigot 1005 to the first section 1121 of the gasket 1120. The substantially rigid members 1129 may be provided with geometry for gripping the outer surface of the spigot 1005, such as the teeth 1131 illustrated in FIG. 16. Other geometries for gripping the outer surface of the spigot may include, for example, rough surfaces, a plurality of raised protrusions, and the like.

One of the advantages of the inner shape of the bell of the current embodiment is that it allows for the use of single durometer material. Joint seals for ductile-iron pipe must accommodate a wide range of variations in the dimensions of the bells and spigots. Axial loading of the gaskets are a result of assembly forces and hydrostatic forces from the interior and exterior of the piping system. Typically, the softer rubbers used for effective sealing require longitudinal support to prevent displacing the seal during assembly and hydraulic loading. Commonly used joints require longitudinal support for the gasket by providing a harder rubber anchored in a groove in the bell.

Figure 17:
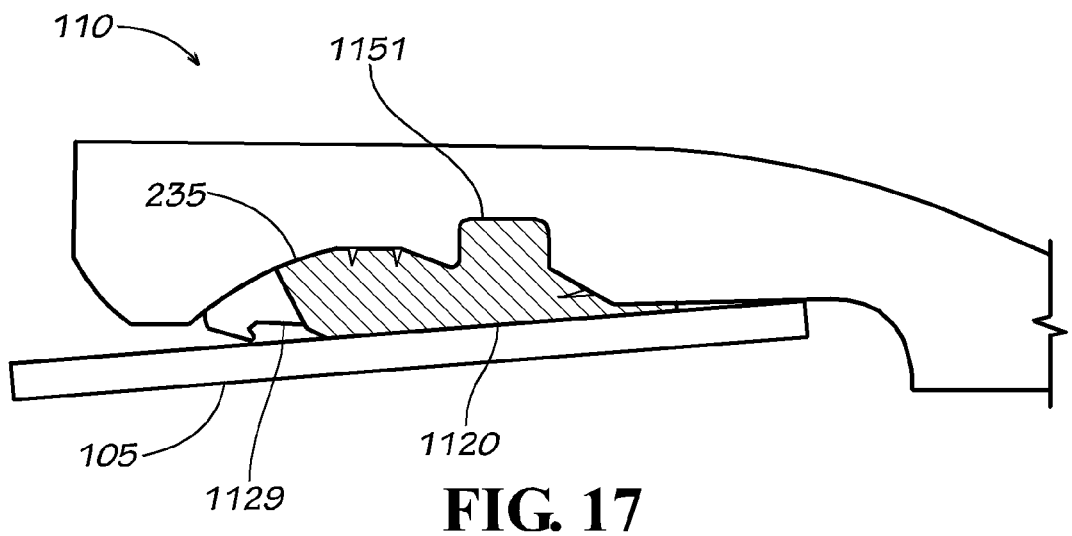
FIG. 17 is a partial cross-sectional view of a bell in accord with one embodiment of the current disclosure.

It has been determined that a single durometer gasket having a design like the one illustrated as 115 in FIG. 1 may be deformed (roll over) under certain high pressure and/or high deflection conditions. In an embodiment of the current disclosure, illustrated in FIG. 17, a bell 110 is illustrated with a gasket seating area 1151. In this embodiment the shape of the gasket seating area 1151 in combination with the shape of the gasket heel 1128 (in FIG. 16) serves to prevent rollover of a single durometer gasket 1120 under higher pressure or high deflection conditions. In this embodiment, as with the embodiment illustrated in FIG. 7, the incoming spigot 105 first passes past the segments 1129 and advances to the K-type seal in the second section 1123 of the gasket 1120. The combination of the gasket 1120 and the segment 1129 are designed to provide an interference fit between the spigot 105 and the segments 1129 of approximately 0.010". The elasticity of the gasket 1120, the expanding diameter of the internal inner surface 235 of the bell 110, the design of segment 1129, and the expansion and contraction grooves 1125 and 1127 of the gasket (shown in FIG. 16) facilitate the ease of moving the segments 1129 out of the way during spigot insertion. The seating of a single durometer gasket 1120 deeper in the bell in the gasket seating area 1151 easily accommodates these forces. As the spigot 105 advances, it passes through the area of the gasket 1120 having the gasket heel 1128 in the gasket seating area 1151 before encountering the K-type seal. As the end of the spigot 105 passes through the seal, the seal is stretched radially and the K-type seal is displaced in the direction of the travel of the incoming spigot. Movement of the gasket heel 1128 is prevented by the seating surface in the gasket seating area 1151. As the line (pipe) is filled with fluid and hydraulic force is applied to the single durometer soft rubber gasket 1120, there will be a tendency for the gasket 1120 to be displaced. The advancement of the gasket 1120 is stopped by the segments 1129 spaced around the circumference of gasket 1120. Spacing of the segments 1129 is dictated in part by the requirement of providing support for the gasket and preventing extrusion of the gasket through the space between the bell 110 and the spigot 105.

The desired attributes of the restrained joint of each embodiment of the current disclosure include low insertion force, improved deflection capabilities, and improved segment loading efficiencies. The low insertion force attribute is addressed by the novel design of the gasket 1120. Deflection capability and segment loading attributes are addressed by the interior profile of the bell 110 the gasket seating area 1151 and where the segments 1129 contact the interior surface 235 under the various component dimensional variations and locations of spigot 105 including angular deflection and radial offset.

One aspect of the current disclosure is the use of parabolic shaped ramp (inner surface 235). The shape of the inner surface 235 approximates the pattern of a circular shape rotated through a plane. It should be recognized that slightly different parabolic curves are generated by deflecting spigots of minimum nominal, and maximum diameters. Starting with these curves and enhancing them with adjustments for dimensional variations in other components resulted in the sequence of surfaces blended together to form the interior profile of the ramp where the segment traverse for the varying degrees of deflection. These modifications provide enhanced deflection capability and segment engagement efficiency around the circumference of the spigot. This has been demonstrated by post testing observations and measurements of segment engagement patterns including depth of tooth penetration.

The advantage provided becomes apparent when comparing the deflection capabilities and segment loading patterns of a bell 110 having an paraboloid inner surface 235 with a bell having a straight-line conical section inner surface which is used in prior art with wedge-action locking segments. In a bell with a straight-line conical section inner surface, without deflection of the spigot 105, one would see uniform loading around the circumference of the spigot 105 assuming that the bell and spigot are round. However, as the joint is deflected the loading on the individual segments would change as the spigot applies additional force on the segments toward the radius of deflection and reduces the force on the segments on the side away from the radius of deflection. This change in loading of the segments results in some segments carrying a disproportional high load and other segments carrying much lower loads. This uneven loading pattern would put undesirable concentrated loading on the spigot which would be especially critical in spigots with thin walls. To some extent the negative impact of this uneven loading could be reduced by adding more segments but that would be an uneconomical solution and would not fully address the problem.

Other inner surface shapes may be used with some sacrifice of loss of segment loading efficiency. In other words, as one moves from the preferred embodiment through a series of concave shapes eventually ending on a straight line (conical shape) the loading pattern (i.e. the force required to insert the spigot 105) deteriorates. Practically speaking though, a short series of conical sections that approximate the curve of the preferred embodiment could produce less effective yet acceptable segment loading. Other concave shapes for inner surface 235 with the shortest radii at the front of the bell would also work but, again, with some loss in segment loading efficiency.

Gripping the surface of a softer, lower tensile strength material such as PVC typically requires substantially more contact area than for harder, higher tensile strength materials such as ductile iron. This increase in contact area may be accomplished by maximizing circumferential engagement and extending the length of linear engagement.

The number, spacing, and depth of serrations or teeth of segment 1129 engaging the surface of spigot 105 must reflect the loading anticipated on the restrained joint. The smaller tolerance on PVC pipe outside diameters may require small modifications in the size of segment 1129 and gasket profile. Lengthening of the segment 1129 to attain more linear engagement would require more axial length of the inner surface 235 (segment contact area) if the joint deflection capability for ductile pipe systems is required for PVC.

Figure 18:
FIG. 18 is a partial front view of an embodiment of a locking segment in accord with one embodiment of the current disclosure.

FIG. 18 shows a circumferential curve in the segment. Segments may be cut out of a ring machined to the profile shown in the cross section in FIG. 19. The curvature in an upper surface 1155 of the segment 1129 facilitates the ability of the segment 1129 to move within the inner surface 235 of bell socket 220 to accommodate variations in deflections and spigot dimensions. The radius of curvature of the upper surface 1155 need not be an exact match to the inner surface 235. For example, the same segment 1129 may be used for pipes with 4-inch through 12-inch diameters. Segments 1129 may also be cast or formed to the dimensions. For example, the cross section could be produced in a drawing operation (straight). A forming operation could then be used to put a curve in the segment stock. Then, a shearing operation would be used to cut the stock into segments. The dimensions of the segment 1129 are such that there will be a slight interference with the incoming spigot 105 (e.g. approximately 0.010 inch). This interference is planned to maintain contact of the teeth of the segment with the outer surface of the spigot 105 and to energize the first section 1121 of the gasket 1120, where the gasket 1120 is attached to the segment 1129.

Figure 19:
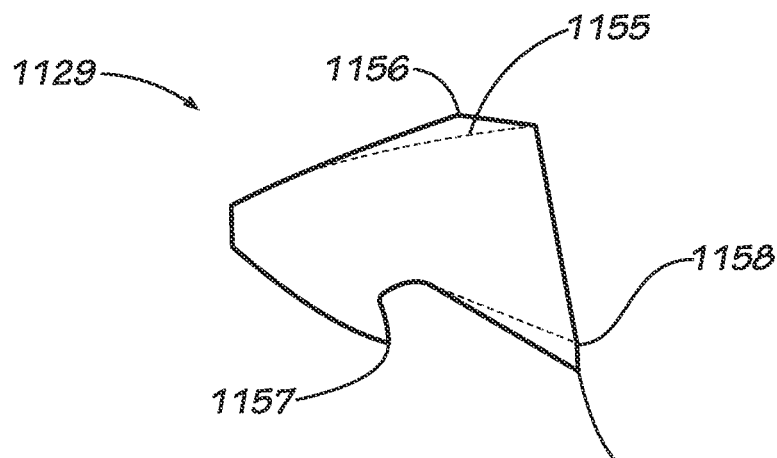
FIG. 19 is a cross-sectional view of an anti-extrusion segment in accord with one embodiment of the current disclosure.

Illustrated in FIG. 19 is a segment 1129 with two possible shapes for the upper surface of segment 1129. The upper surface 1155 configuration (in dashed line) is a simple radius curve. An upper surface configuration 1156 may be provided to adjust for tolerances in the various joint components and for deflections of the spigot 105 in the bell 110. Similarly, the second tooth 1158 (dashed line) of segment 1129 may be extended (illustrated as second tooth 1159 in a solid line) to adjust for such tolerances.

Figure 20:
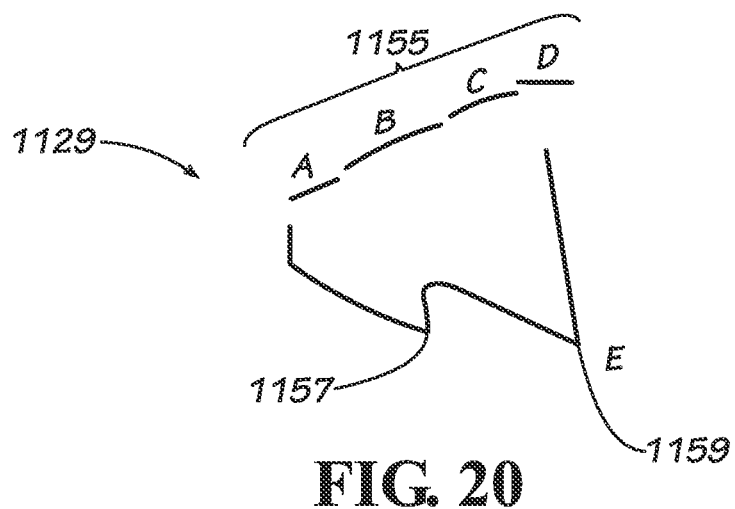
FIG. 20 is an exploded cross-sectional view of an embodiment of an anti-extrusion segment in accord with one embodiment of the current disclosure.

FIG. 20 shows an exploded cross section of the segment 1129 to illustrate four features on the upper surface 1155 of the segment 1129 as well as the lowering of the second tooth. The first portion of the upper surface 1155 may be a straight line to increase contact in the forward portion of the inner surface 235 to keep the segment 1129 from corning out of the bell 110. In this embodiment, the straight section A does not match the curve in the inner surface 235 and the mismatch results in interference with the front of the bell making further movement of the segment 1129 difficult. Portions B and C of the segment 1129 illustrated in FIG. 20 may be curved surfaces designed to maximize surface contact for variations in spigot diameters and deflections of the joint. The whole top of the segment and the bell contour is designed to maximize the axial loading component of the force vector. Portion D is provided to maintain segment location during gasket production. Portion D prevents the bending in the cylindrical portion of the gasket that causes the segment to rotate (clockwise) out of position. Rotation of the segment out of position could lead to improper tooth engagement. This design helps to maintain contact of both teeth on the spigot surface. In addition, the design eliminates the possibility of a sharp upper back corner of the segment engaging with the surface of the bell and causing a counter clockwise rotation of the segment causing damage to the gasket. To avoid having a situation where only the first tooth engages the spigot in certain specific joint configurations, the second tooth may be extended (portion E) so that both teeth remain in contact with the spigot. Single tooth engagement brings increased risk of spigot penetration, tooth breakage, or lack of engagement. In the preferred embodiment, the included angle in the first tooth 1157 is approximately 60° and the included angle in the second tooth 1159 is approximately 54°.

Locking segments 1129 have more freedom of movement (axially, radially, a id rotating off-axis circumferentially). Segments currently in use are typically constrained axially by a retainer bead and a retainer seat of existing bell sockets, and laterally by the hard and soft rubber of the gasket (dual durometer) which hold them in position and separate and space them. These segments are free to pivot within the bell about the retainer bead for 4" through 24" sizes, and within a retainer groove for 30" and 36" sizes. The pivoting action is restricted to a path that is axially aligned with the centerline of the mating pipes. Consequently, the teeth of segments currently in use will, under proper assembly conditions, engage the spigot of the mating pipe in a circumferential pattern. Also, the segments currently in use are constrained radially by the height of the annulus between the bell socket and the mating spigot. Out-of-round conditions can impair performance beyond the ability of the segments to compensate by moving axially within the bell socket.

The segments 1129 are not securely locked in position since they are mounted by attachment of the hack edge of the back tooth 1159 of the segment to the front edge of the gasket 1120. The segments do not have to be encapsulated in the gasket 1120. Because the gasket 1120 is an elastic material capable of considerable deformation, the segments 1129 can rotate off-axis, and also move axially within reasonable limits beyond the normal confines of the segment upper surface 1155 to compensate for out-of-roundness or other irregularities in bell socket 220 or spigot 105.

The cross sectional shape of the gasket 1120 in FIG. 16 also facilitates freedom of movement of the segments by the inclusion of carefully selected angles of the gasket edge and hack edge of the segments 1129 where they mount to the gasket. The inclusion of expansion/contraction grooves 1125 and 1127 (shown in FIG. 16) in the gasket end behind the segment 1129 allow additional freedom of movement of the segments with the curve of inner surface 235 of bell socket 220. The segments 1129 have radial freedom of movement to conform to the inner surface 235 of bell socket 220 by ramping up toward the vertex of the paraboloid as the mating spigot is withdrawn.

Another feature is that once the teeth 1157 and 1159 of the segment 1129 are locked in position in the surface of the spigot 105 by penetration, additional deflection is still available in the joint by flexure of the aligned segments as a whole. Thus the engaged joint is not rigid as with currently used joints but permits some flexure resembling ball joint action. This feature may make the joint suitable for additional applications such as HDD (Horizontal Direction Drilling).

For ductile iron pipe components, the segments 1129 may be manufactured from suitable steel capable of being heat treated to adequate hardness and other key physical properties by any of several methods. The forming methods include machining a ring with the curved bearing surface of the segment on the outside diameter, the teeth on the inside diameter, and suitably machined nose and back tooth angles. Segments of suitable length can then be cut radially from the ring and heat treated.

The segments 1129 may be made from steel bar stock cold-drawn as a straight bar with the suitable profile, cut into lengths long enough to roll-form into a semicircle, and then further cut into segments of suitable length prior to heat treating. Alternately, the segments 1129 may be produced by investment casting provided the foundry and its toolmaker have the technology to maintain all critical profiles and details, including tooth sharpness and freedom from porosity.

Segments 1129 for plastic pipe, such as PVC, may be machined from hard plastic stock or metal as described above, or may be molded from a harder plastic such as polycarbonate or ABS by heating and injecting into a suitable metal die cavity. The principal material requirement here is that the segment material be harder and stronger that the PVC pipe, be capable of supporting relatively sharp teeth, and be economical since the circumferential and axial engagement pattern must be substantially greater than that for ductile iron, if metal segments are chosen, it is unlikely that hardening by heat treating will be required.

The gasket body 1120 will be more economical to produce since single durometer rubber will be used as opposed to dual hardness rubber for presently used gaskets. Also, the gasket 1120 may be thinner than presently used gaskets making it lighter and requiring less material. Curing times should be permissive of shorter mold curing cycles, increasing machine output.

The bite pattern on spigots pressure tested with gaskets made in accordance with the current disclosure (see FIGS. 11-13) demonstrates the unique ability of the individual segments 1129 to seek a location that maximizes their engagement with the spigot 105. The bite marks show not only the location of the each segment 1129 but also their orientations and the depths of penetration of the teeth. Studies of post-testing spigots show that segments have the flexibility to move axially and rotate off-axis. Tooth penetration, including the two teeth of individual segments, was uniform around the periphery of the spigot.

It has also been observed that after pressure testing assemblies in deflected positions, the angle of deflection of the joint could easily be changed. Subsequent evaluations indicated that the segments (with their teeth imbedded in the spigot surface) and the spigot moved as a unit within the inner curvatures of the bell.

The uniformity in depths of bite marks shows even distribution of the load around the spigot 105. This is particularly advantageous as the metal thicknesses of pipe walls are reduced. The ability of the joint to deflect after the teeth have set is a favorable contrast to joints presently in use that are essentially rigid after being pressurized.

The freedom of movement of the locking segments 1129, including movement out of the path of the incoming spigot 105, is one advantage. While minimizing the drag on the spigot, the compressed elastomer maintains an axial force on the segment so that it fills the available and possibly changing gap. This auto-positioning of the individual segments 1129 keeps them in contact with the surface of the spigot 105. When the spigot 105 starts to retract the segments engage quickly, minimizing the amount of joint pull out during pressurization.

Figure 21:
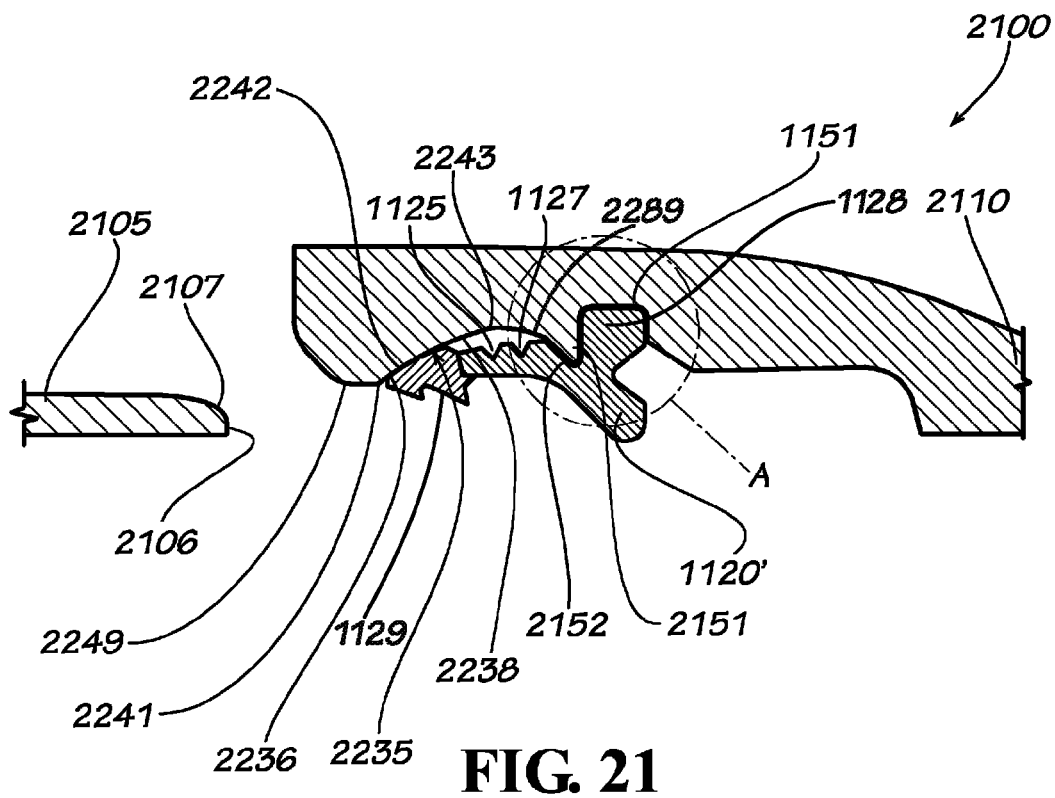
FIG. 21 is a partial cross-sectional view of an embodiment of the system in accord with one embodiment of the current disclosure.

Another embodiment of the system is seen in FIG. 21. System 2100 includes a spigot 2105, a bell 2110, and a sealing device which, in the current embodiment, is shown as gasket 1120', which is an annular elastomeric member in the current embodiment. Additionally, substantially rigid member 1129 is shown along with the system 2100. Several features of this embodiment are highlighted below.

Figure 22:
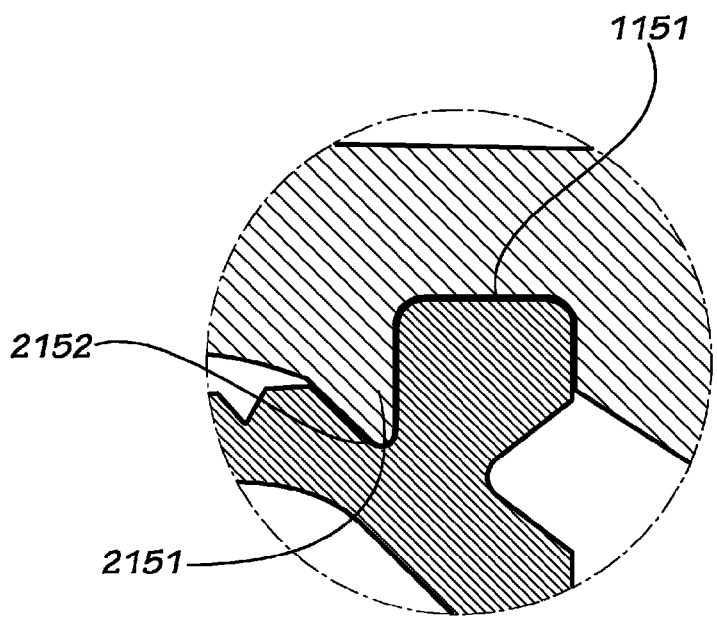
FIG. 22 is a detail view of a lip of a bell of the system as denoted by detail A of FIG. 21.

Testing of prior embodiments showed that, at maximum deflection angles and extremely high pressures—including pressures far above typical operation limits, for example, 1000 psi—a small portion of the gasket could extrude and be seen at the face of the bell 110 of previously-described embodiments. While this did not necessarily impede performance, concerns were raised about the durability of such a configuration in long-term operation. The problem was eliminated as seen in the embodiment of FIGS. 21 and 22. An extended lip 2151 to the gasket seating area 1151 in the bell 2110 anchors the gasket 1120'. The extended lip 2151 extends radially into the bell 2110 further than in prior embodiments. Because the extended lip 2151 retains a gasket heel 1128 of the gasket 1120', the gasket 1120' is unable to extrude beyond the extended lip 2151 without significant malformation, a condition that is not possible in this configuration.

Additionally, an insertion groove 2152 is shown added ahead of the gasket heel 1128 of the gasket 1120'. The insertion groove 2152 allows the gasket 1120' of the current embodiment to seat more easily in the altered profile created by the extended lip 2151, as previously described. The insertion groove 2152 is shown oriented radially on the gasket heel 1128 to interface with the extended lip 2151. The insertion groove 2152 allows a mating relationship with the extended tip 2151 that further prevents rollout of the gasket 1120' under pressure.

In the current embodiment, an inner surface 2235 of the bell 2110 defines a blended curve that includes several portions. In the current embodiment, each portion is a paraboloid portion, including a first portion 2236 which is a large paraboloid and a second portion 2238 which is a smaller paraboloid. As such, the truncated elliptic paraboloid of other embodiments may include two paraboloid portions as described with reference to the current embodiment. Because the paraboloids of the first portion 2236 and the second portion 2238 form a blended curve, the inner surface 2235 of the bell 2110 is not easily described through mathematical formulae. A conical portion may be included between the first portion 2236 and the second portion 2238 in some embodiments. The conical portion allows for tolerancing to blend the first portion 2236 with the second portion 2238. For the sake of understanding the current embodiment, the paraboloid portions may be characterized as having a radii of curvature that approximates a parabolic shape in the region specified. In the current embodiment, the first portion 2236 may be roughly approximated by a surface having a radius of curvature of about ⅔ the pipe diameter; the second portion 2238 may be roughly approximated by a surface having a radius of curvature of about ⅓ the pipe diameter. The first portion 2236 of the inner surface 2235 is continuous from point 2241 to point 2242 in the current embodiment. The second portion 2238 is continuous from point 2242 to point 2243 in the current embodiment. For reference, the pipe diameter of the current embodiment is 6 inches.

Although the radii of curvature of various portions are shown and described in relation to the pipe diameter of the current embodiment, one of skill in the art would understand that the radius of curvature of particular portions may or may not change in other embodiments. For example, joints with larger or smaller pipe diameters in some embodiments may include a first portion having a radius of curvature of ⅔ the pipe diameter and a second portion having a radius of curvature of ⅓ the pipe diameter. In other embodiments, joints with larger or smaller pipe diameters may include the same surface profile in the same dimensions shown and described herein, regardless of the diameter of the pipe.

The inner surface 2235 of the current embodiment provides several advantages over previously-described embodiments. First, it allows greater engagement of the substantially rigid members 1129 with the inner surface 2235 of the bell 2110 during deflection of a joint made between the bell 2110 and the spigot 2105. As the joint deflects and the bell 2110 and spigot 2105 become angled with respect to each other, the point of each substantially rigid member 1129 that contacts the inner surface 2235 may change. Because deflection of the joint will cause the substantially rigid members 1129 to travel along the curvature of the inner surface 2235, the blended curve arrangement of the inner surface 2235 accounts for the contact point of the substantially rigid members 1129 with the inner surface 2235 to change as the joint deflects. As such, even though each substantially rigid member 1129 may be moving along the inner surface 2235 and rotating to maintain engagement with the spigot 2105, the blended curve profile of the inner surface 2235 ensures that each substantially rigid member 1129 maintains contact with the inner surface 2235, thereby promoting the engagement of each substantially rigid member 1129 with the spigot 2105.

Moreover, the blended curve arrangement of the inner surface 2235 takes better account of pipe tolerances to allow better engagement by the substantially rigid members 1129 when the spigot 2105 and bell 2110 are at maximum or minimum manufacturing tolerances. An incurving portion 2289 is also seen leading to the extended lip 2151. In the current embodiment, the incurving portion 2289 is included to allow a flow path for casting the extended lip 2151. Other advantages may be seen in tolerancing as well as function.

In prior embodiments, a bell throat 225 is shown as a positive stop, wherein the ledge of the bell throat 225 is oriented radially. This arrangement can provide a challenge during casting of the bell 210.

In the current embodiment, a nose curve portion 2249 is used to provide a stop for translational movement of the substantially rigid members 1129 in biting engagement with the spigot 2105. Although prior embodiments displayed the bell throat 225 as a positive stop, such an arrangement is not necessary. As such, the nose curve portion 2249 of the current embodiment does not require special casting elements and can be cast more easily than previously-described embodiments while providing similar functionality.

It should also be noted that an elliptical portion 2107 can be seen along an end 2106 of the spigot 2105 in the current embodiment. A radial dimension of the elliptical portion 2107 covers about one-half of the wall thickness of the spigot 2105. An axial dimension of the elliptical portion 2107 is about three times as large as the radial dimension. Together, the elliptical portion 2107 defines one quarter of an ellipse. The elliptical portion 2107 aids in the deflection of the joint by preventing the end 2106 of the spigot 2105 from restricting additional deflection. In most applications, a bevel (shown in FIGS. 11-13) is added to the end of spigot 105 before the spigot 105 is inserted into the bell 110. The elliptical portion 2107 of spigot 2105 may be cast instead of being added in the field, thereby preventing a field technician from taking the additional step of adding the bevel.

Other embodiments and uses will be apparent to those skilled in the art from consideration of the specification and practice of the embodiments disclosed herein. All references cited herein, including all publications. U.S. and foreign patents and patent applications, are specifically and entirely incorporated by reference. It is intended that the specification and examples be considered exemplary only with the true scope and spirit of the disclosure indicated by the following claims. Furthermore, the term "comprising" includes the terms "consisting or" and "consisting essentially of," and the terms comprising, including, and containing are not intended to be limiting.

The invention claimed is:

1. A system for sealing a spigot, the system comprising:
a gasket, the gasket having a front end, a first section, and a second section, the gasket defining at least one groove in the first section;
at least one substantially rigid member contacting the front end, the substantially rigid member made of a material that is more rigid than a material of the gasket; and
a bell encircling the gasket, the bell defining a gasket seating area, the bell including an inner surface, wherein the inner surface includes a blended curve;
wherein the blended curve includes a first portion including a radius of curvature of about two-thirds of a diameter of the spigot and a second portion including a radius of curvature of about one-third of the diameter of the spigot.

2. The system of claim 1, wherein the blended curve includes at least one paraboloid.

3. The system of claim 1, wherein the gasket defines an insertion groove.

4. The system of claim 3, wherein the insertion groove is defined at the joining point of the first section and the second section.

5. The system of claim 3, wherein the insertion groove mates with an extended lip of the bell.

6. The system of claim 1, wherein the bell includes an extended lip.

7. The system of claim 6, wherein the extended lip is proximate the gasket seating area.

8. The system of claim 1, wherein the gasket includes a gasket heel, and wherein the gasket heel mates with the gasket seating area.

9. The system of claim 1, wherein the substantially rigid member includes teeth.

10. The system of claim 1, wherein the spigot includes an end and wherein the end includes a quarter ellipse portion.

11. A system for sealing a spigot, the system comprising:
a gasket, the gasket having a front end, a first section, and a second section, the gasket defining at least one groove and at least one insertion groove;
at least one substantially rigid member contacting the front end, the substantially rigid member made of a material that is more rigid than a material of the gasket; and
a bell encircling the gasket, the bell defining a gasket seating area including an extended lip, the bell including an inner surface, the inner surface defining a blended curve, the blended curve including at least one paraboloid;
wherein the extended lip and the insertion groove are arranged in mating relationship; and
wherein the blended curve includes a first portion including a radius of curvature of about two-thirds of a diameter of the spigot and a second portion including a radius of curvature of about one-third of the diameter of the spigot.

* * * * *